United States Patent
Gadini et al.

(10) Patent No.: US 7,820,995 B2
(45) Date of Patent: Oct. 26, 2010

(54) COMPONENT FOR A HOUSEHOLD APPLIANCE, IN PARTICULAR FOR A DISHWASHER, AND SUMP FOR A HOUSEHOLD APPLIANCE, IN PARTICULAR FOR A DISHWASHER, USING IT

(75) Inventors: Costanzo Gadini, Frassineto Po (IT); Fabio Nebbia, Giarole (IT)

(73) Assignee: Eltek S.p.A., Casale Monferrato (IT)

( * ) Notice: Subject to any disclaimer, the term of this patent is extended or adjusted under 35 U.S.C. 154(b) by 543 days.

(21) Appl. No.: 11/567,248

(22) Filed: Dec. 6, 2006

(65) Prior Publication Data
US 2007/0144564 A1 Jun. 28, 2007

(30) Foreign Application Priority Data
Dec. 6, 2005 (IT) ............ TO2005A0856

(51) Int. Cl.
B08B 3/04 (2006.01)
A47L 15/42 (2006.01)
D06F 39/08 (2006.01)
G01N 21/17 (2006.01)
G01F 23/292 (2006.01)

(52) U.S. Cl. .......... 250/576; 73/293; 134/113; 250/577

(58) Field of Classification Search .......... 73/1.73, 73/293; 134/56 D, 57 D, 58 D, 104.2, 113; 250/575–577, 574; 356/931
See application file for complete search history.

(56) References Cited

U.S. PATENT DOCUMENTS

| 2,669,323 | A * | 2/1954 | Hilliker | 186/49 |
| 3,279,481 | A * | 10/1966 | Neyhouse et al. | 134/57 D |
| 3,870,417 | A * | 3/1975 | Bashark | 134/57 D X |
| 5,329,951 | A * | 7/1994 | Jones | 134/104.4 |
| 6,771,373 | B2 * | 8/2004 | Schenkl et al. | 356/442 |
| 6,851,312 | B2 * | 2/2005 | Rosenbauer et al. | 73/293 X |
| 6,937,332 | B2 * | 8/2005 | Engler et al. | 356/338 |
| 7,162,896 | B2 * | 1/2007 | Eiermann et al. | 134/113 X |
| 7,540,293 | B2 * | 6/2009 | Yoon et al. | 134/56 D |
| 2007/0272283 | A1 * | 11/2007 | Choi et al. | 134/56 D |
| 2008/0030712 | A1 * | 2/2008 | Tokhtuev et al. | 356/51 |

FOREIGN PATENT DOCUMENTS
EP 1245713 A1 * 10/2002

* cited by examiner

*Primary Examiner*—Thomas P Noland
(74) *Attorney, Agent, or Firm*—Fredrikson & Byron, P.A.

(57) ABSTRACT

The present invention relates to a component for a household appliance, in particular for a dishwasher, and to a sump for a household appliance, in particular for a dishwasher, using it. Both the component and the sump are adapted to detect and/or control the level of a liquid in a tub. The component and/or the sump comprise a light transmitter adapted to generate a light beam, a light receiver adapted to receive the said light beam, and at least one optical element, in particular made of transparent material, adapted to affect the said beam depending on the content of the tub.

55 Claims, 16 Drawing Sheets

Figure 1:
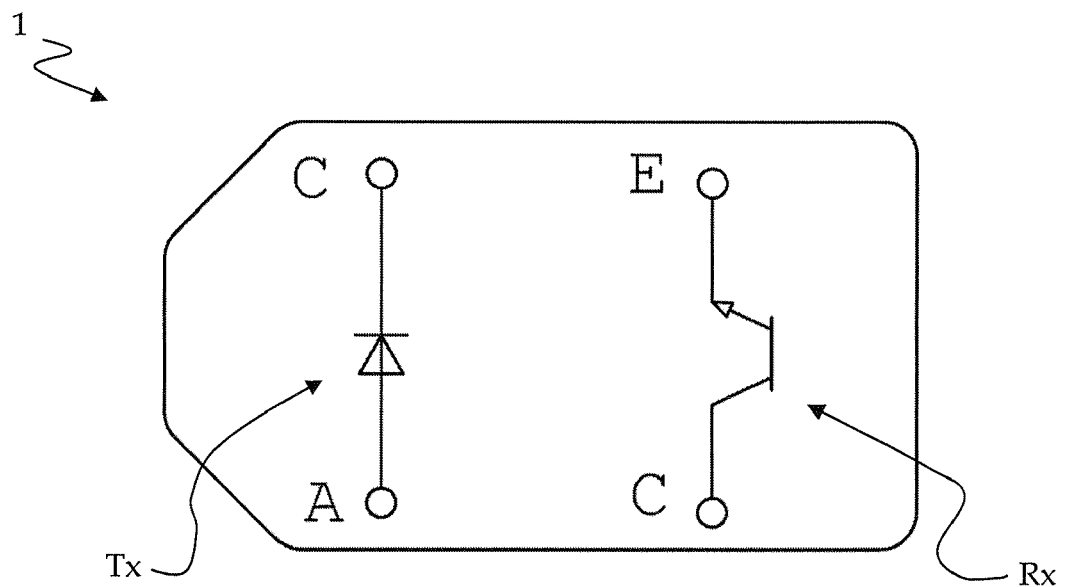

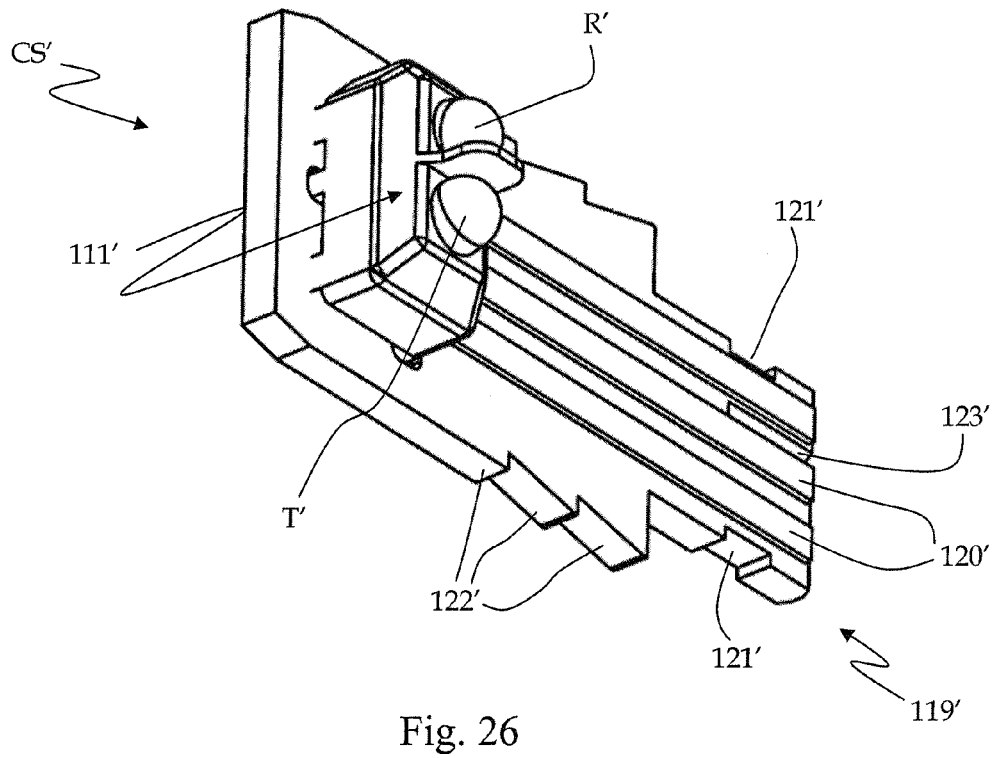
Fig. 26
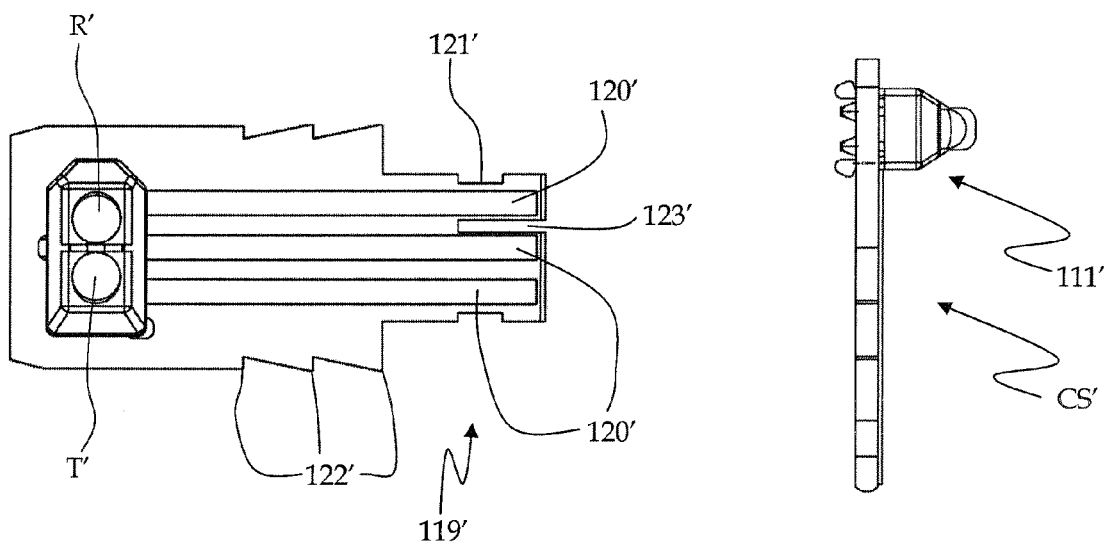
Fig. 27
Fig. 28

COMPONENT FOR A HOUSEHOLD APPLIANCE, IN PARTICULAR FOR A DISHWASHER, AND SUMP FOR A HOUSEHOLD APPLIANCE, IN PARTICULAR FOR A DISHWASHER, USING IT

RELATED APPLICATIONS

This application claims priority to Italian Application No. TO2005A000856 filed Dec. 6, 2005, the teachings of which are incorporated herein by reference.

BACKGROUND OF THE INVENTION

1. Field of the Invention

The present invention relates to a component for a household appliance, in particular for a dishwasher, and to a sump for a household appliance, in particular for a dishwasher, using it.

The present invention is particularly suited to the field of components and systems for household appliances, typically household-use machines for washing, in particular dishwashers.

2. Background Art

In general, several systems for detecting and/or controlling the level of a liquid in a container are known in the art.

Devices are also known in the art for detecting the presence of a liquid in a container through optical means. Such a device comprises a light source, adapted to generate a light beam, and a light detector, adapted to receive said light beam. An optical element fitted on the container wall is adapted to reflect the light beam only when there is liquid in the container. Thus, the light detector receives the light beam only when there is liquid in the container.

It is well known that some types of household appliances comprise a tub adapted to contain liquid, at least during certain operating phases of the household appliance. Some of these types of household appliances, in particular dishwashers, typically comprise a body defining a container fixed under the tub, adapted to collect the water drained from the latter, in particular to discharge it or recycle it for washing purposes, for example, through suitable pumps fitted on or built in said body; said body is generally called "sump".

BRIEF SUMMARY OF EMBODIMENTS OF THE INVENTION

The main object of the present invention is to provide a device which can detect a liquid level in a container through optical means.

It is a second object of the present invention to provide a sump, in particular for household appliances, more in particular for dishwashers, comprising a liquid container fitted with a device which can detect a liquid level in the container through optical means and/or which is adapted to be coupled to and/or to house a device capable of detecting a liquid level in the container through optical means. It is a third object of the present invention to provide such a device and such a sump which are adapted to be manufactured and assembled easily and at low cost and which ensure high operational reliability.

It is a fourth object of the present invention to use and/or apply effectively and efficiently an optical sensor for detecting and/or controlling the level of a liquid, in particular in a household appliance; this problem is particularly felt in household machines for washing, for example in a sump of a dishwasher.

These and other objects, which will be explained in detail below, are achieved according to the present invention through a component for a household appliance, in particular for a dishwasher, and/or through a sump for a household appliance, in particular for a dishwasher, having the features set out in the appended claims, which are intended as an integral part of the present description.

BRIEF DESCRIPTIONS OF THE DRAWINGS

Figure 2:
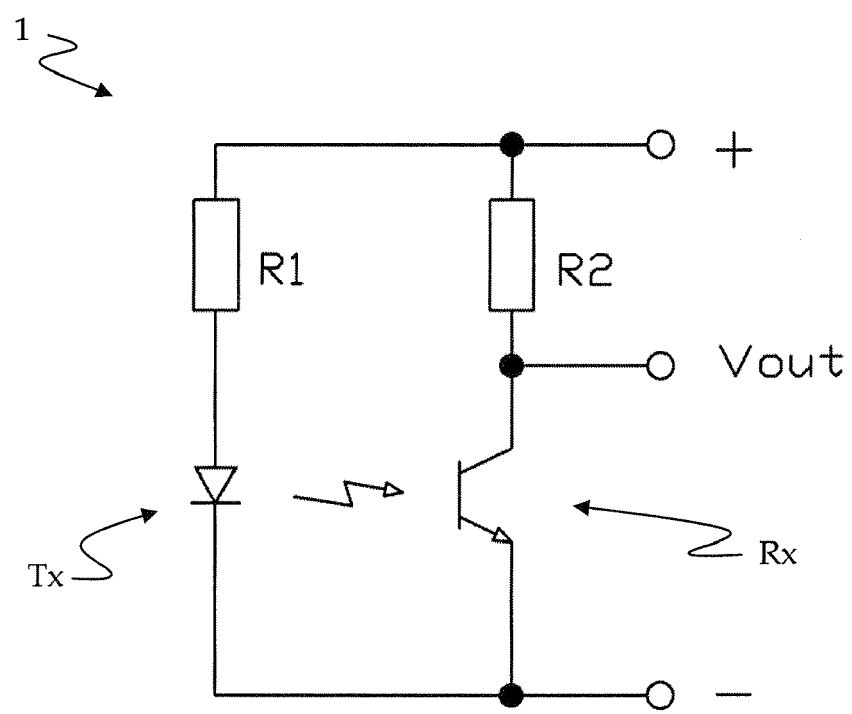
Figure 3:
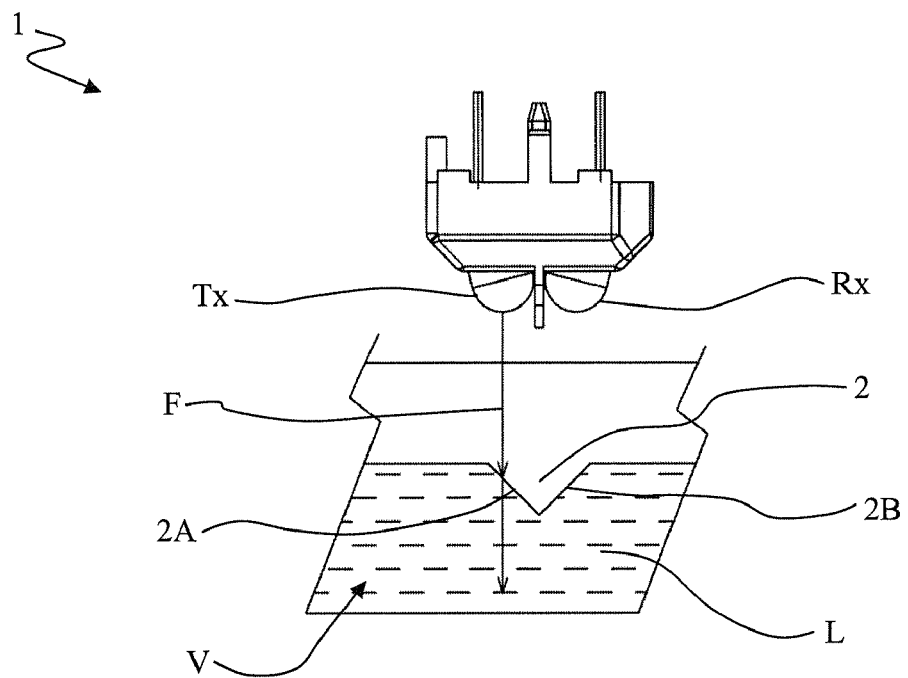
Figure 4:
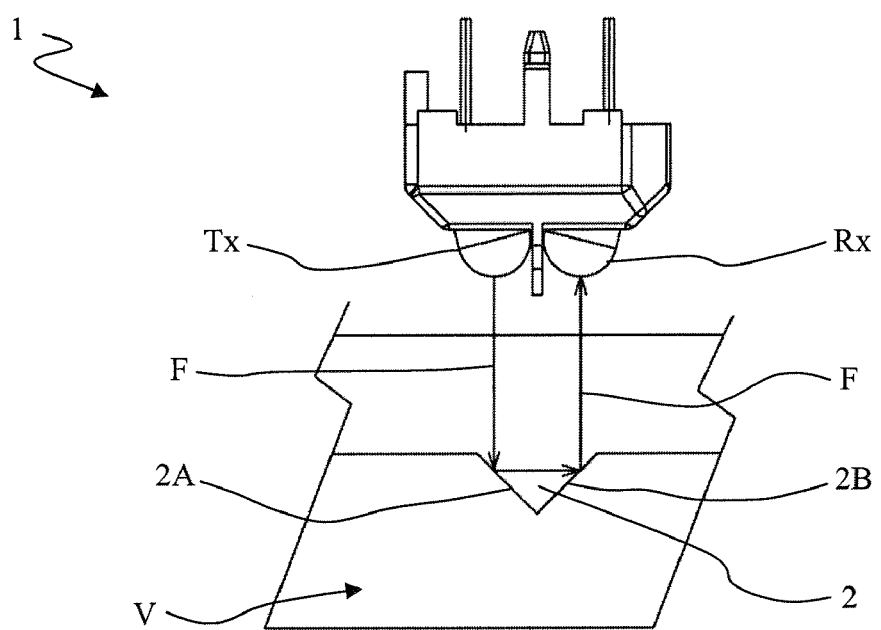
Figure 5:
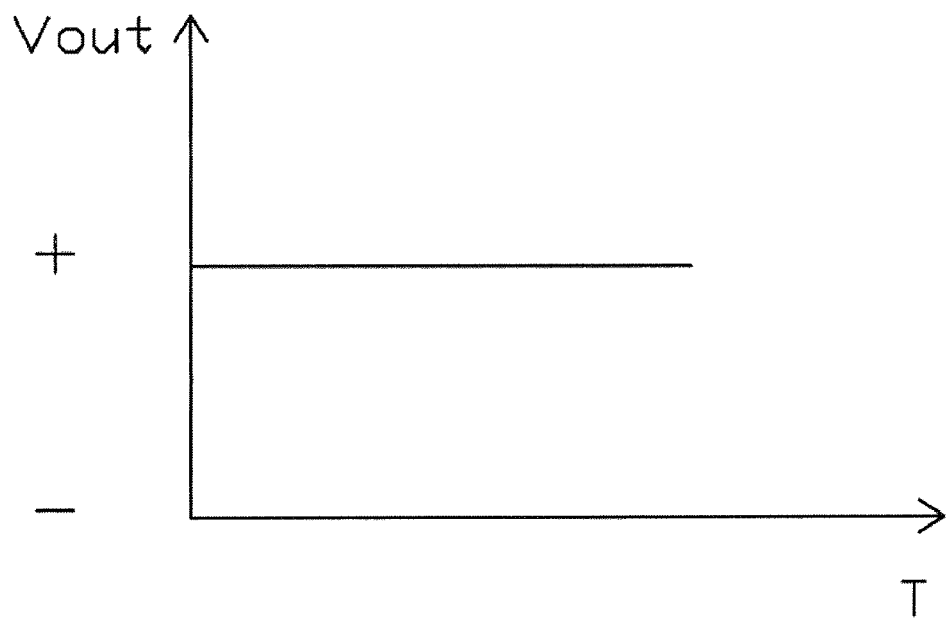
Figure 6:
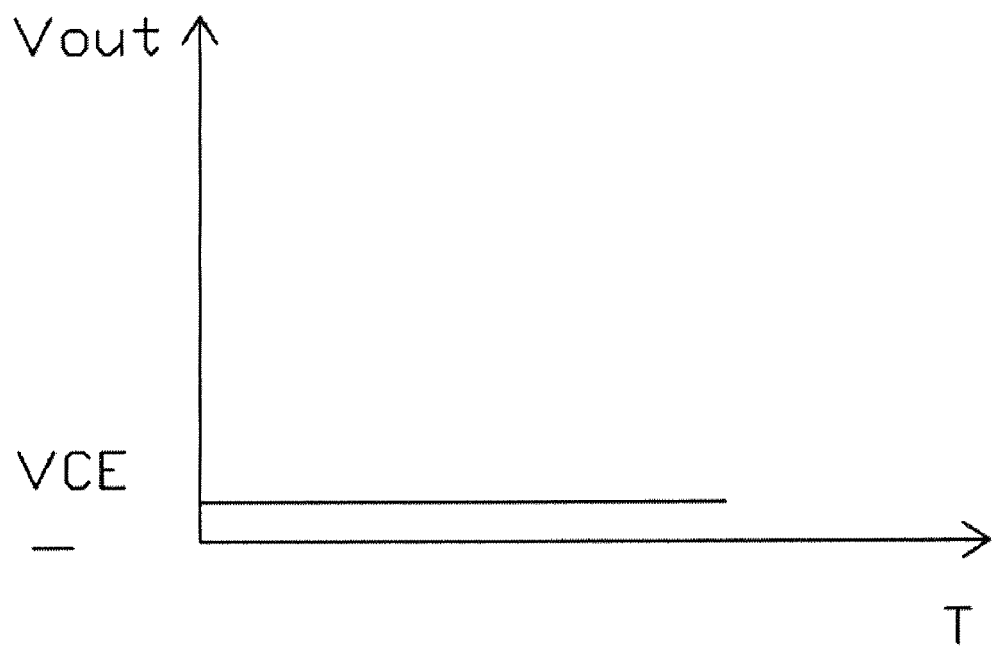
Figure 7:
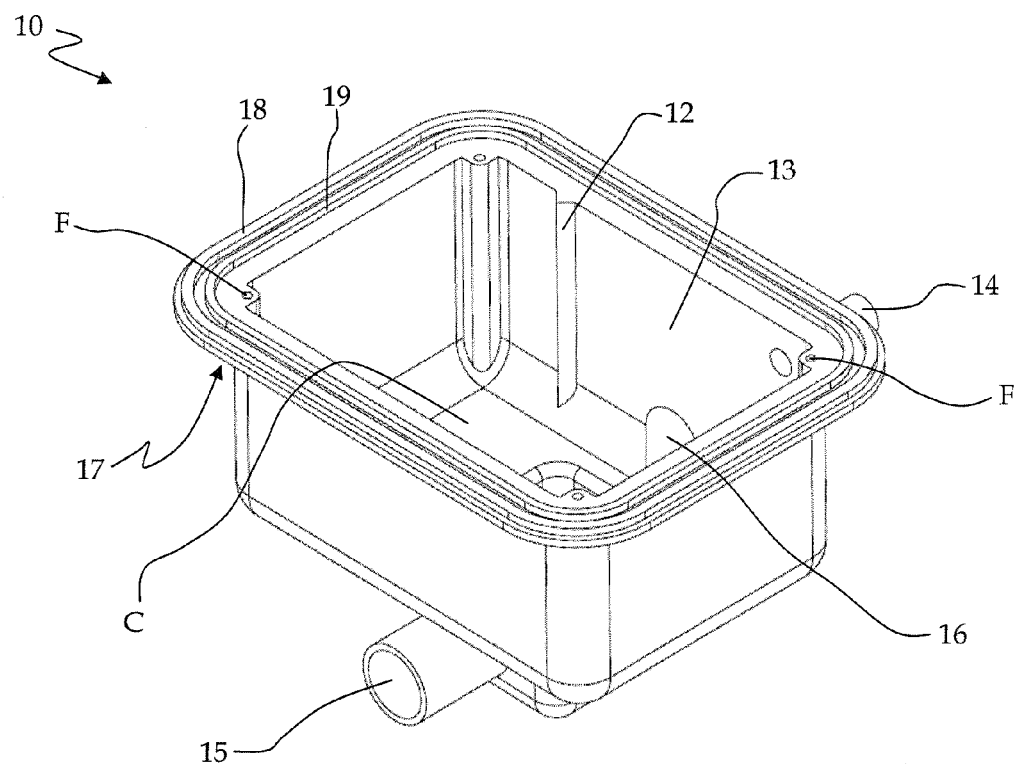
Figure 8:
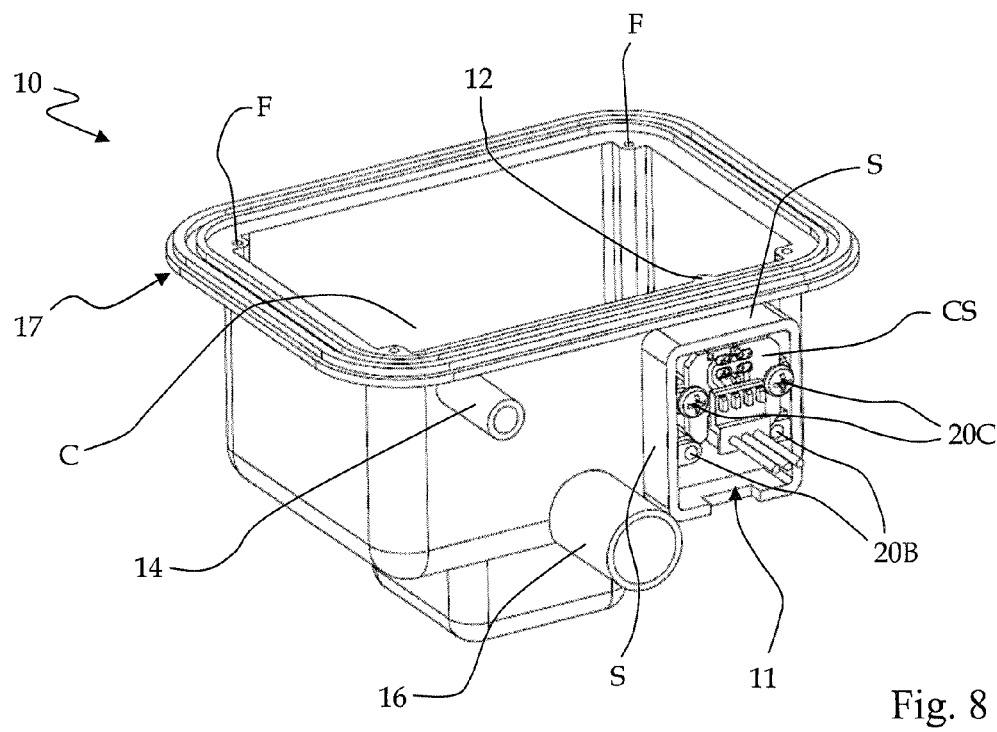
Figure 9:
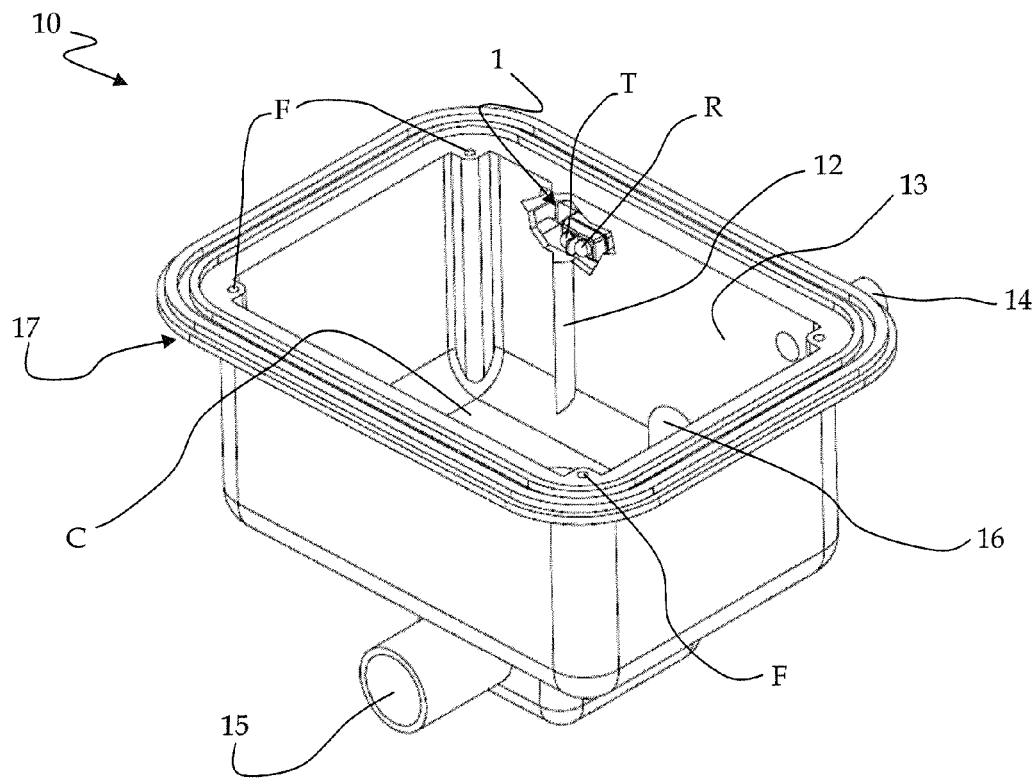
Figure 10:
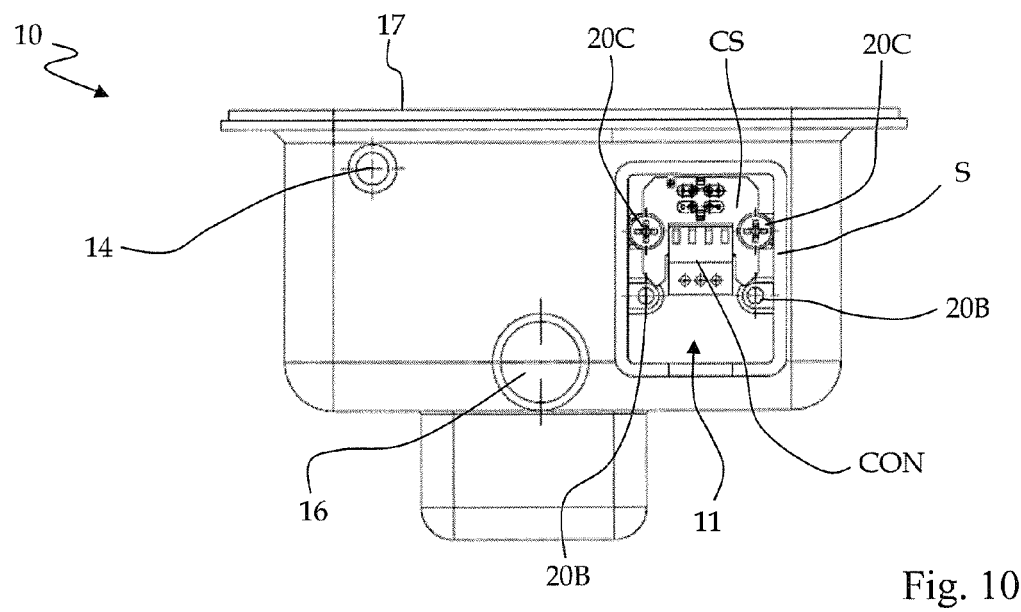
Figure 12:
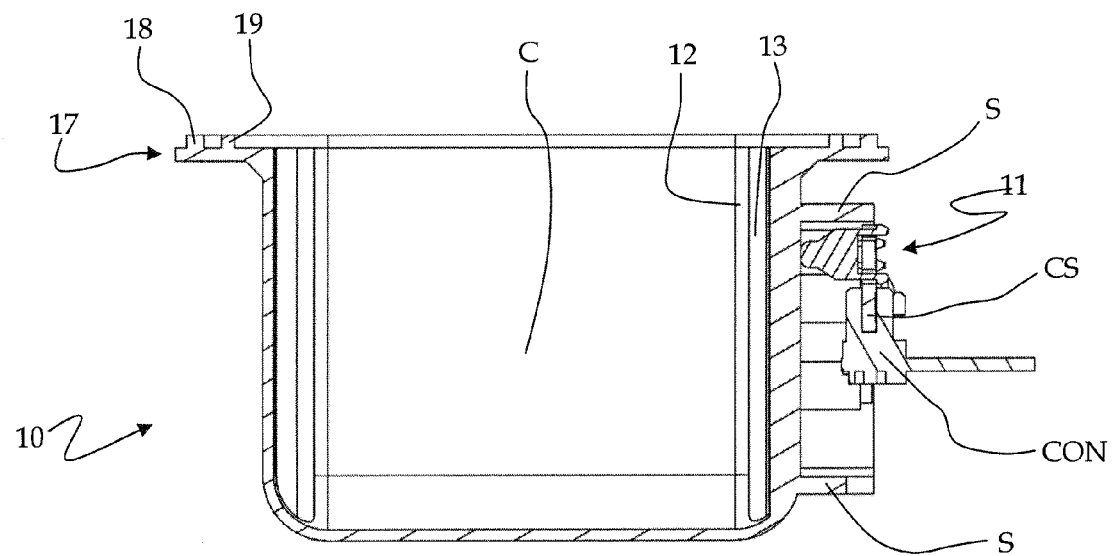
Figure 11:
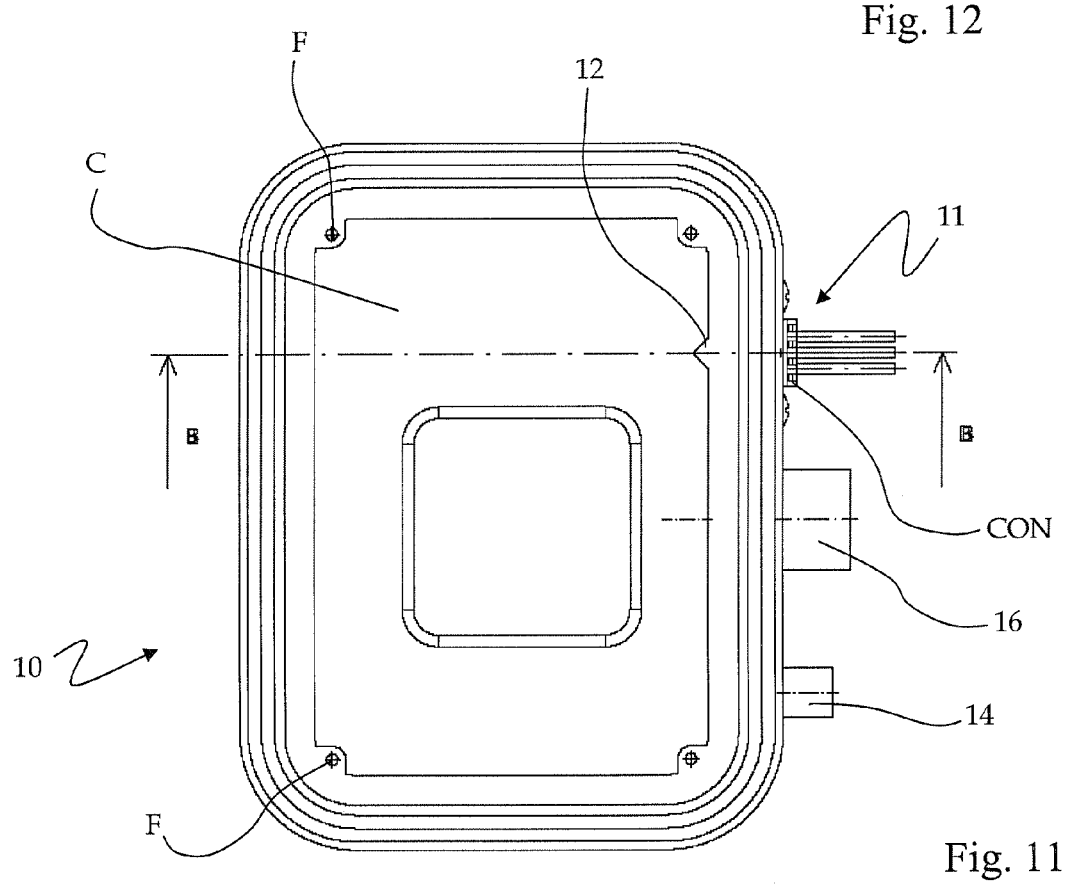
Figure 13:
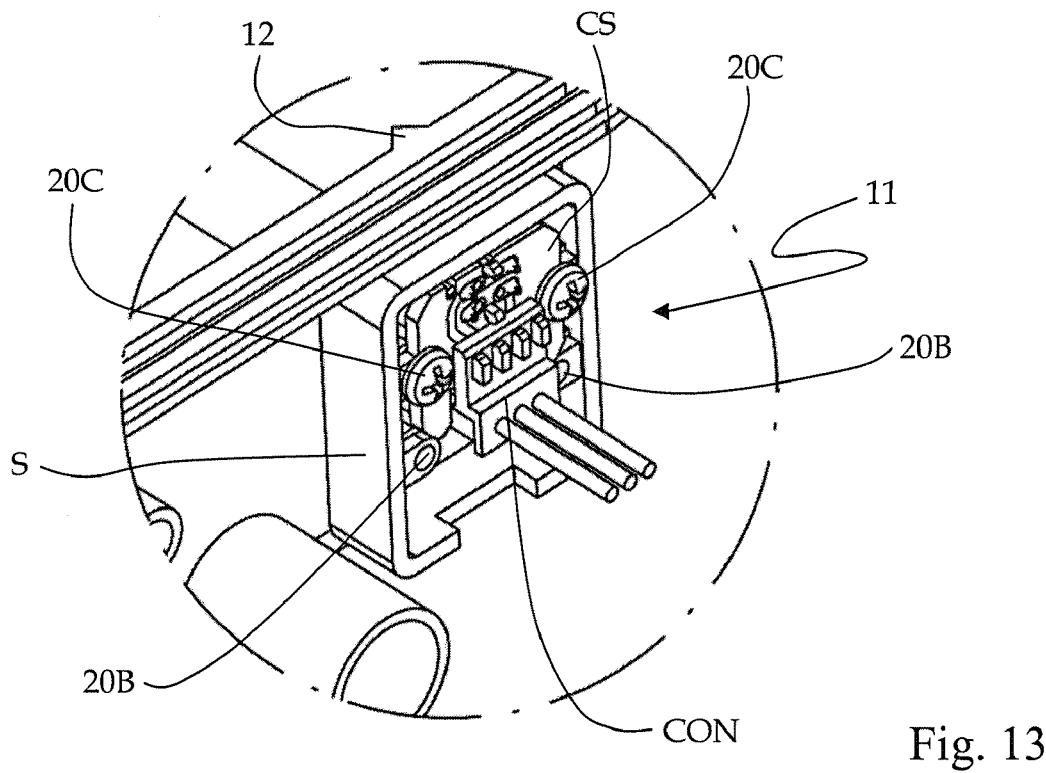
Figure 14:
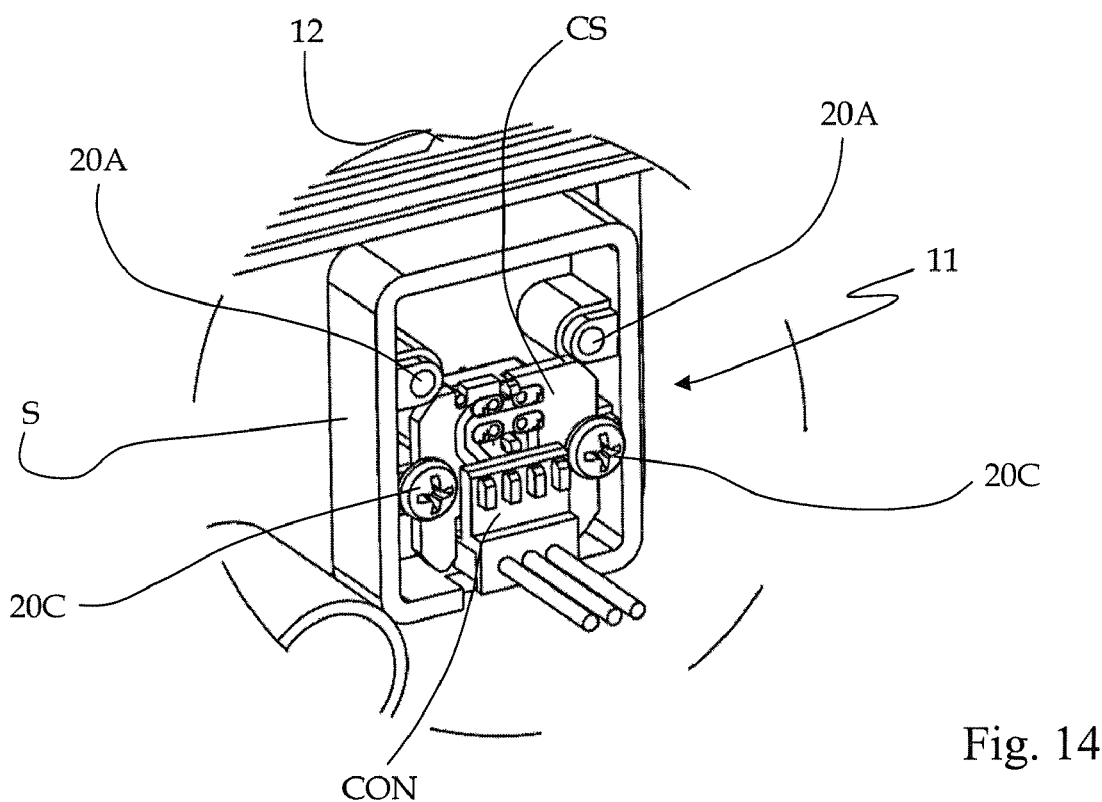
Figure 15:
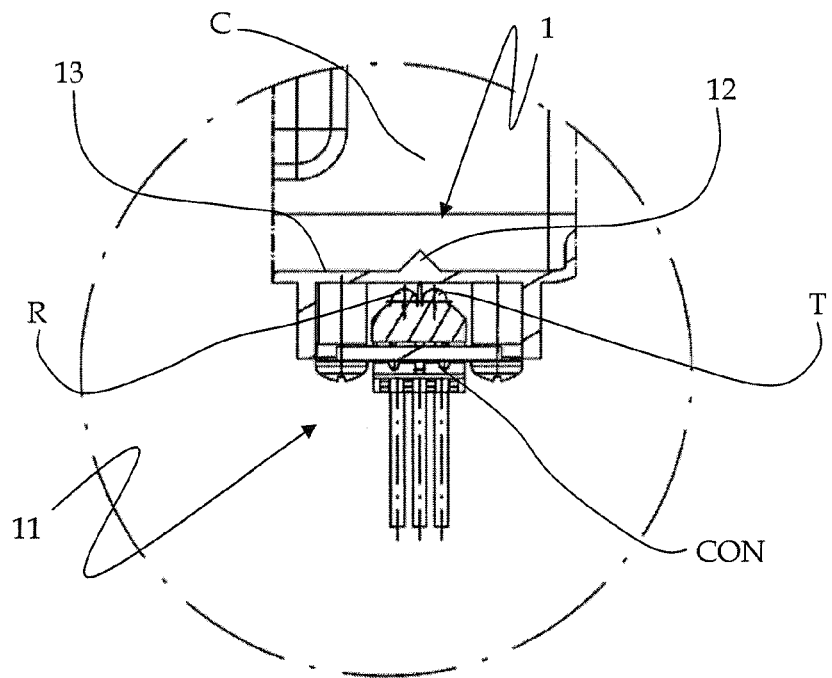
Figures 16, 17:
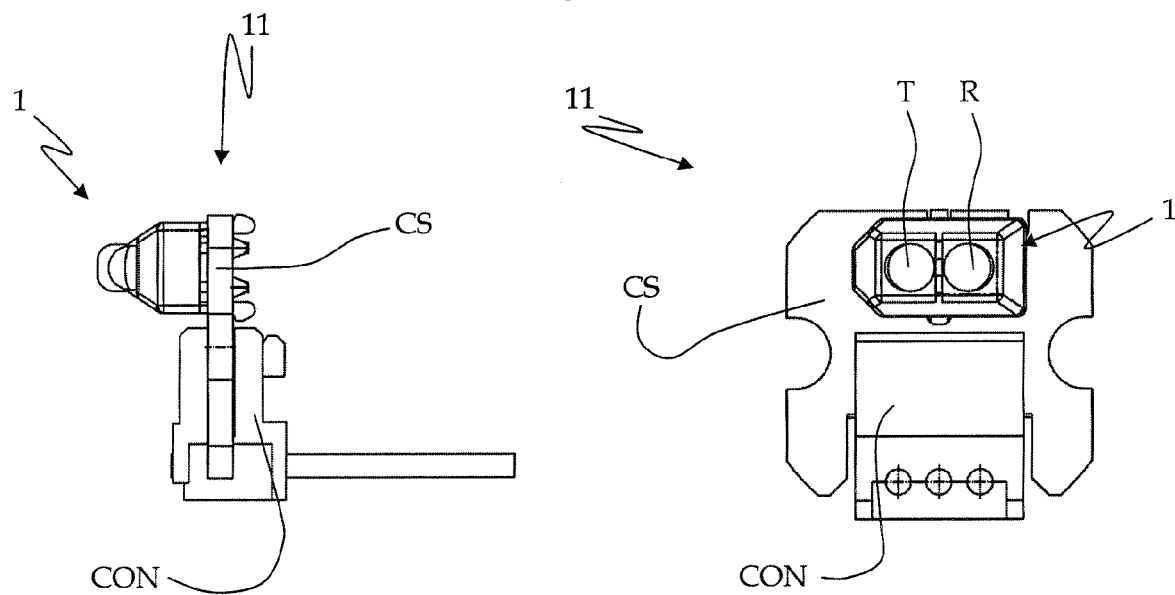
Figure 18:
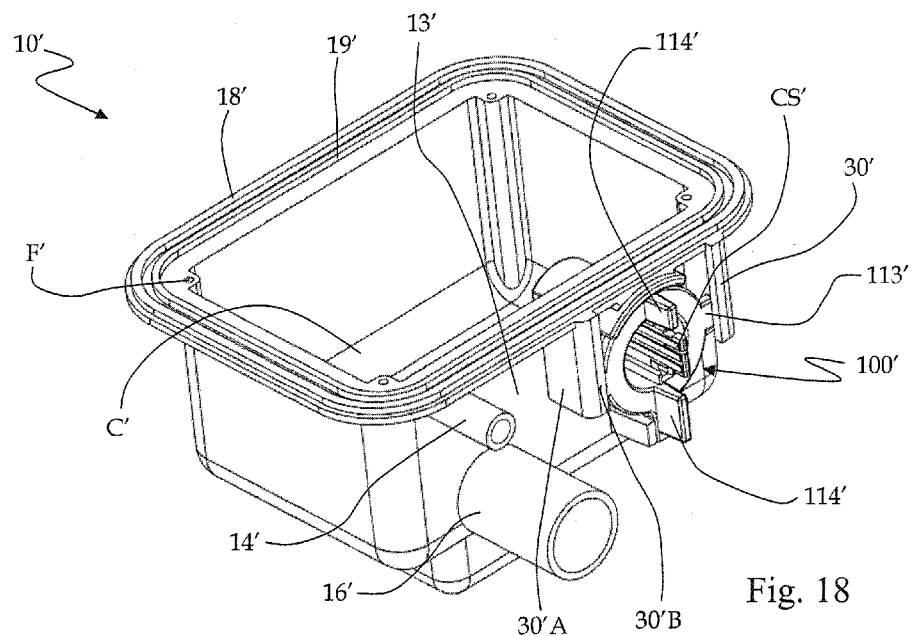
Figure 19:
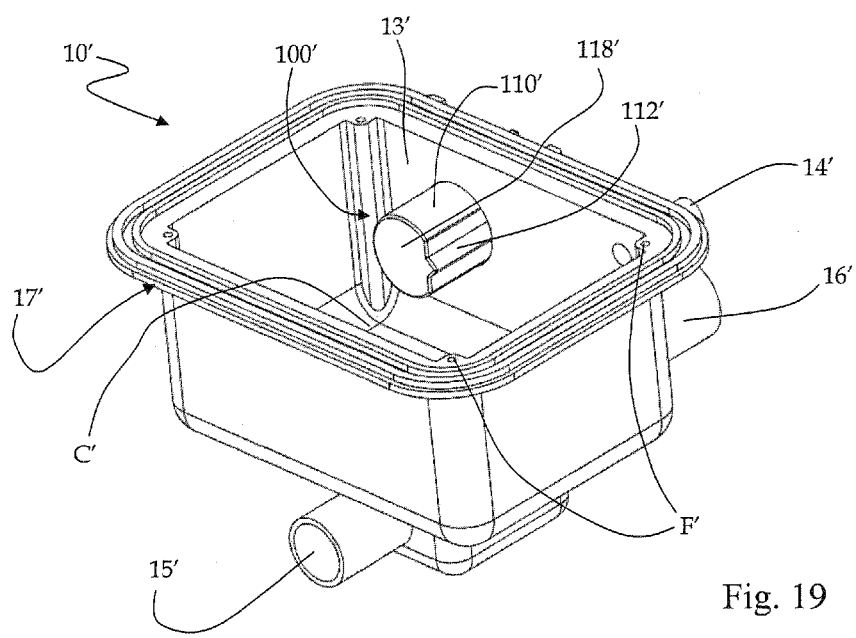
Figure 21:
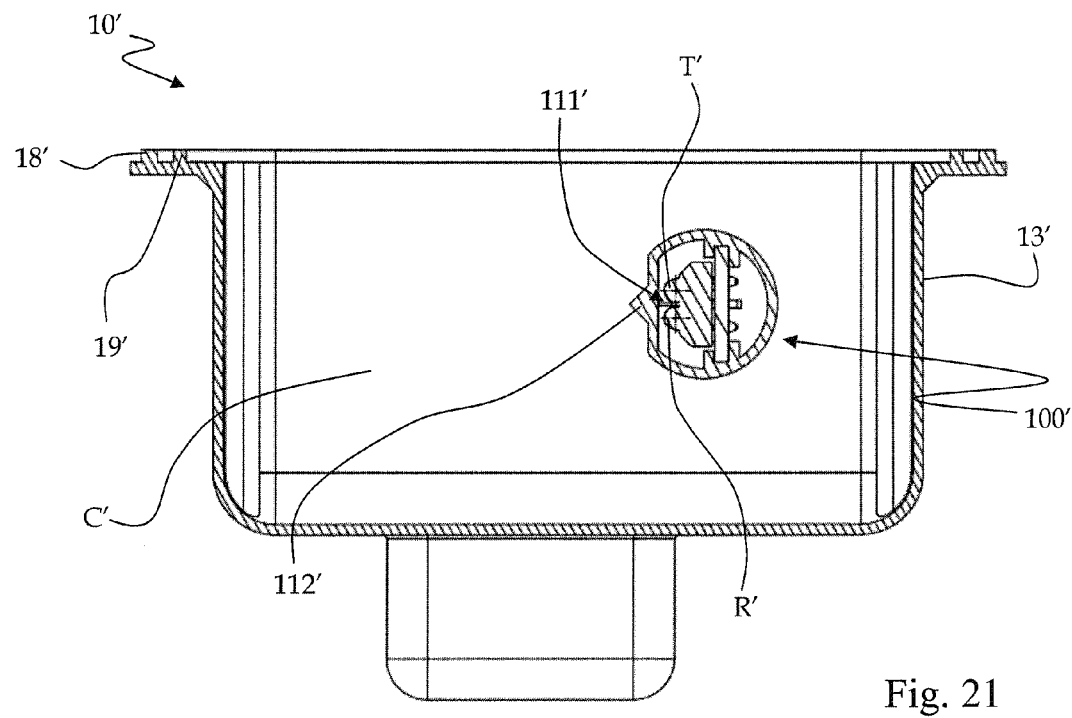
Figure 20:
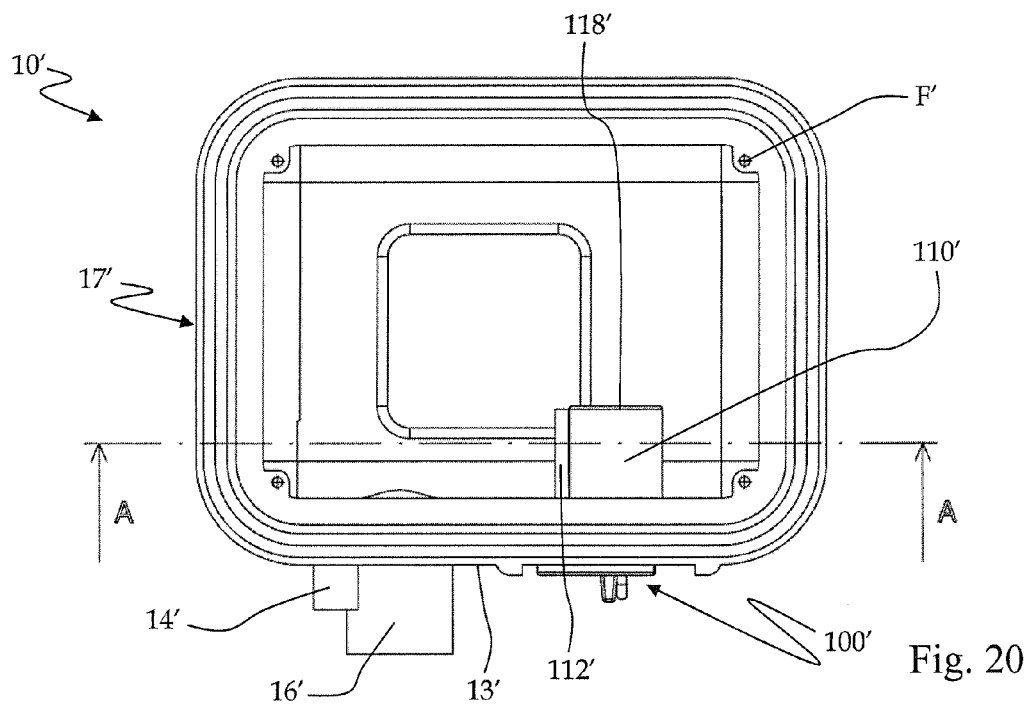
Figure 23:
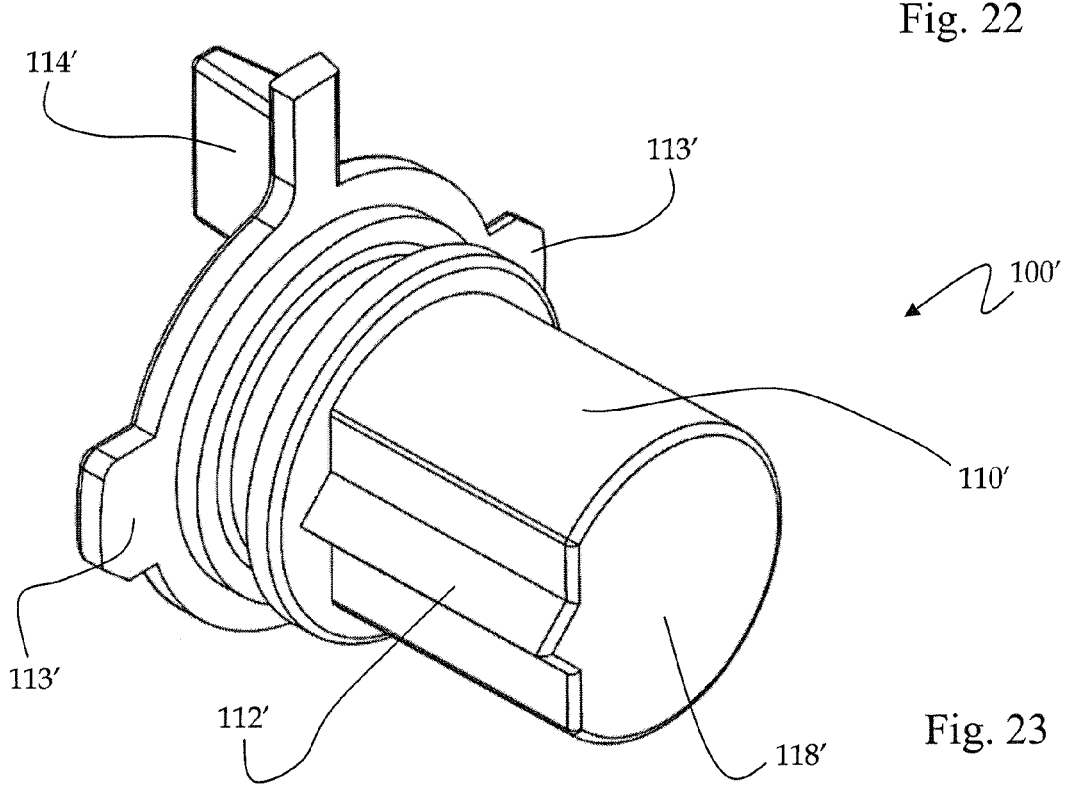
Figure 24:
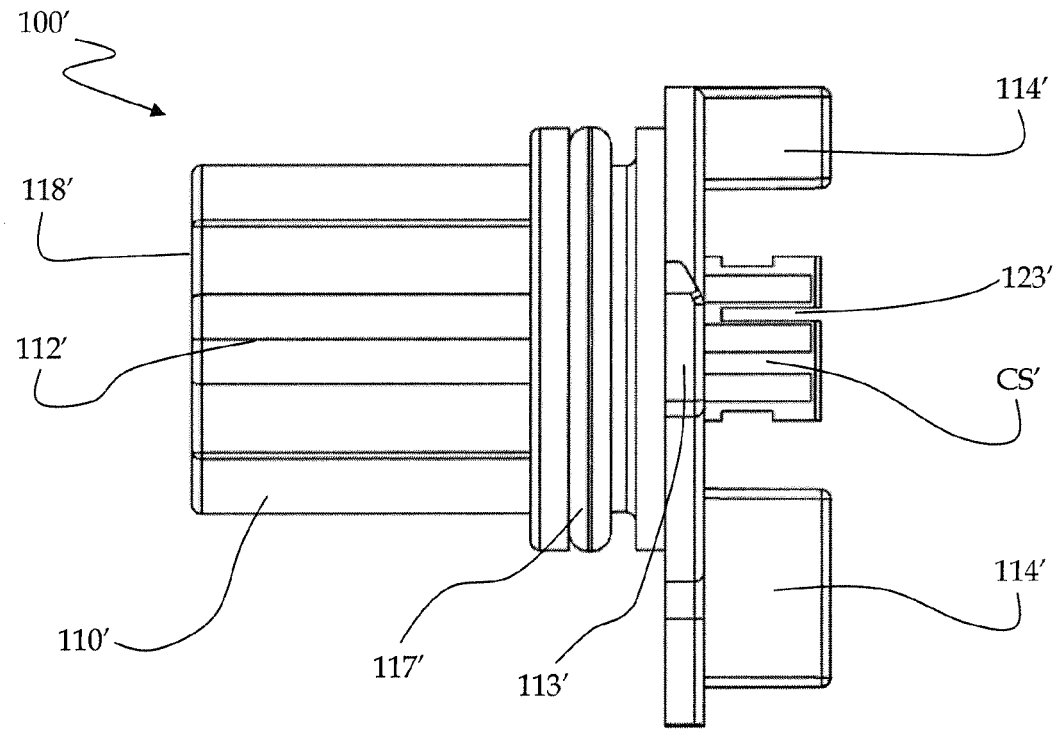
Figure 25:
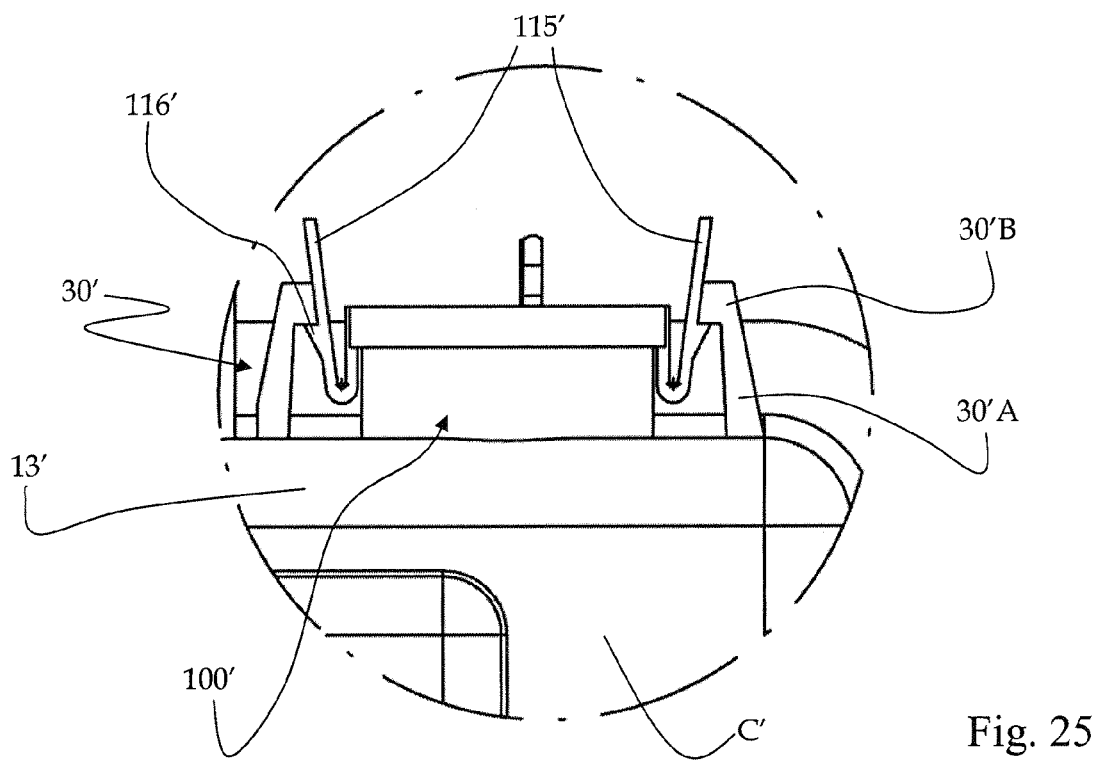
Figure 29:
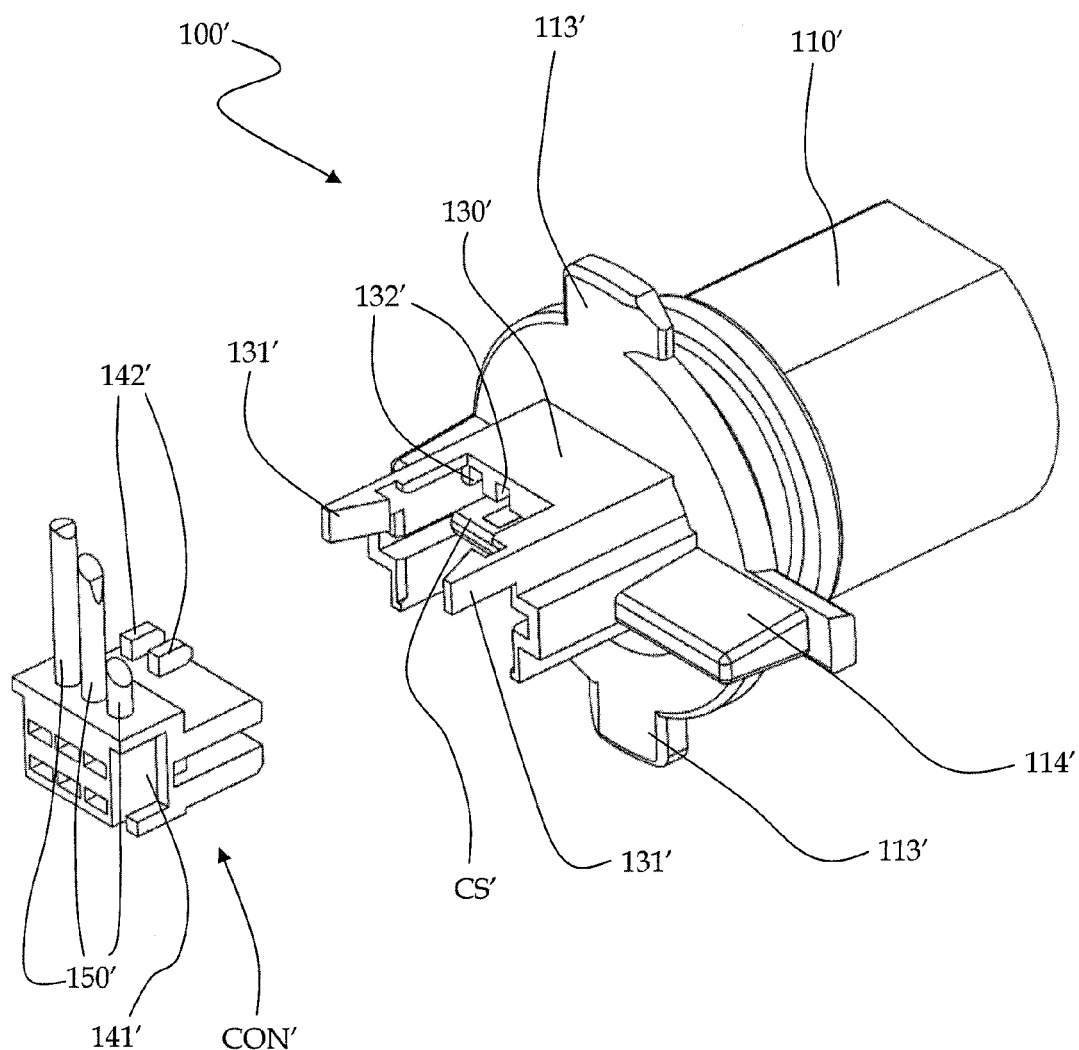
Figure 30:
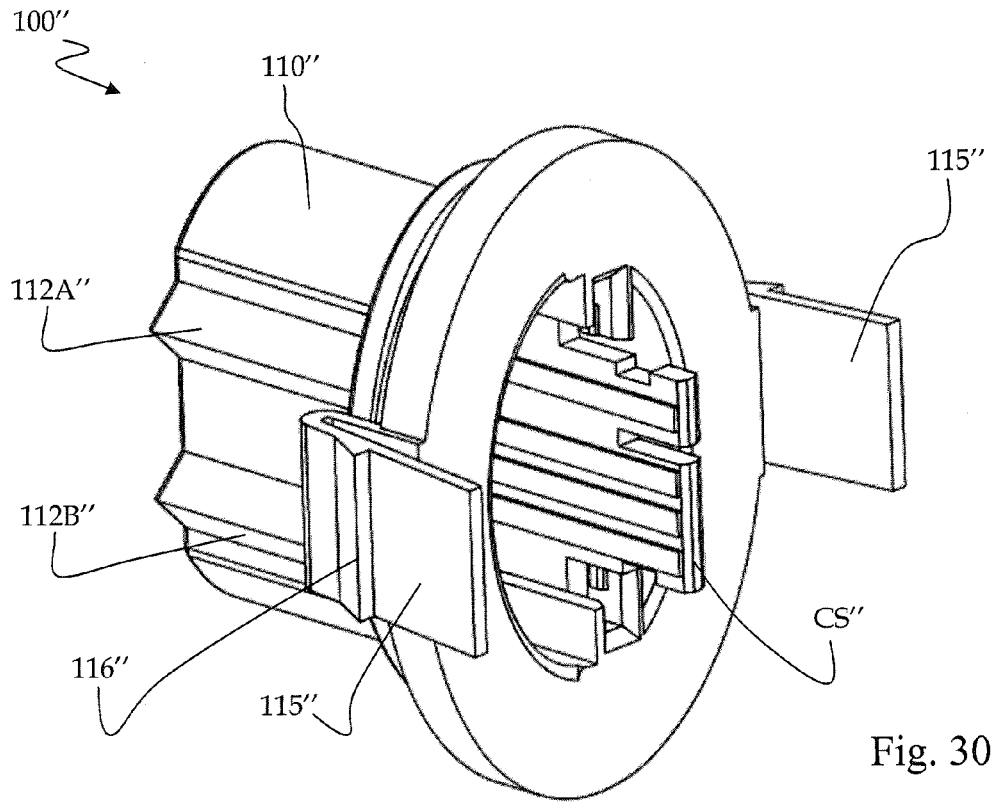
Figure 31:
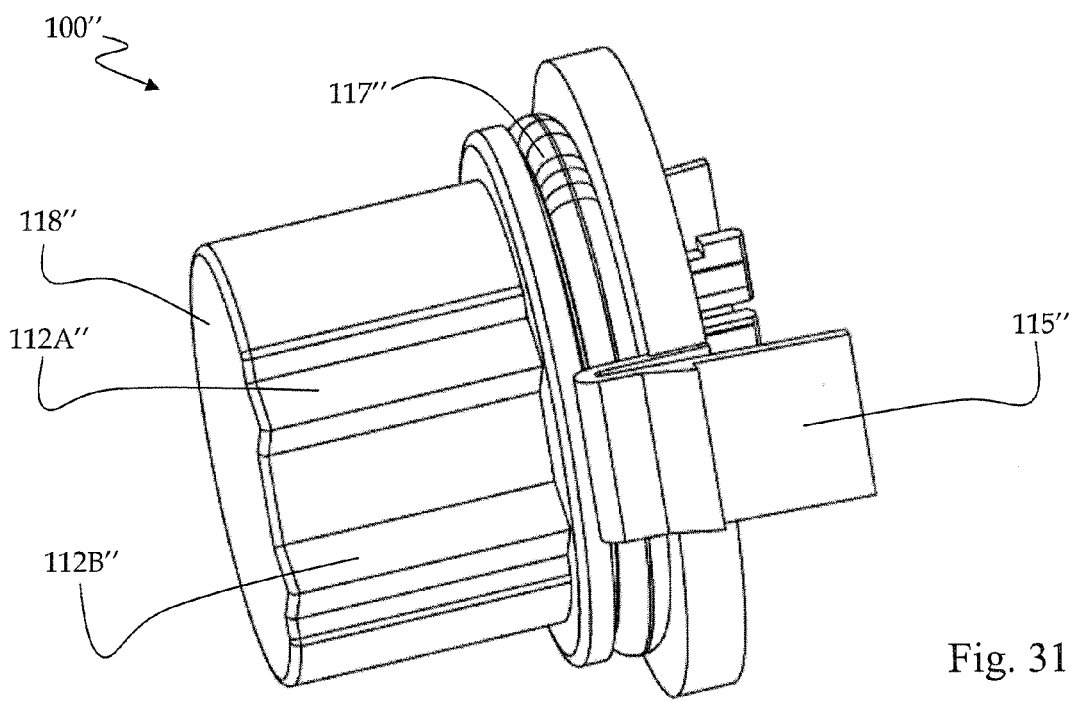
Figure 32:
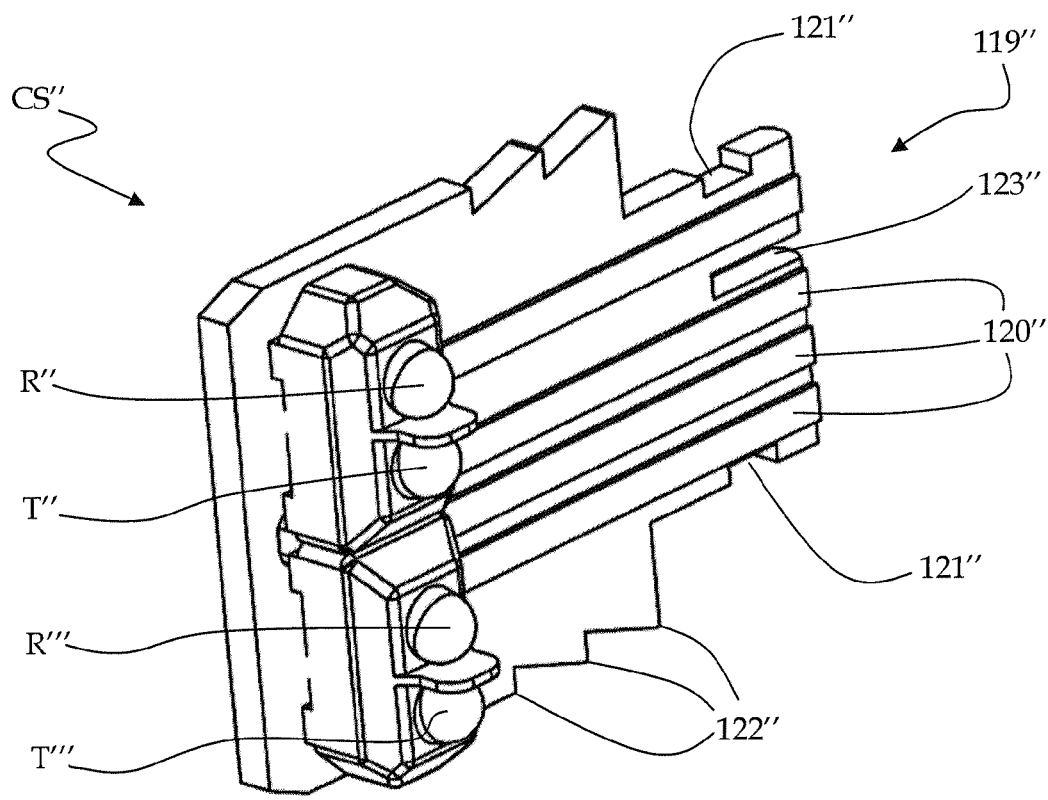
Figure 33:
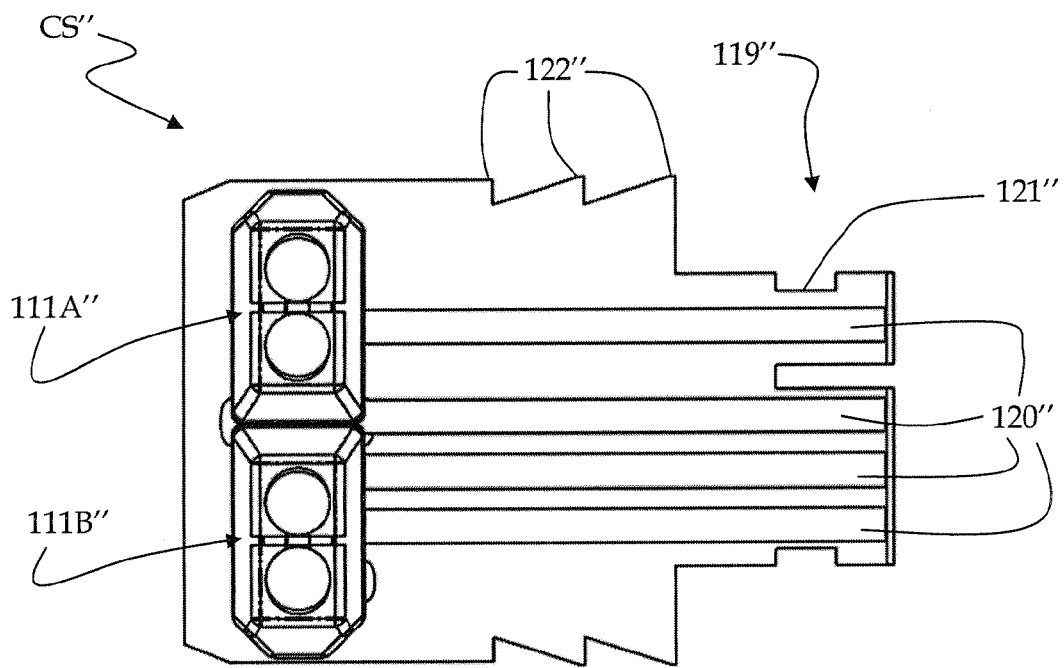

Further objects, features and advantages will become apparent from the following detailed description of preferred embodiments of the present invention and from the annexed drawings, which are supplied by way of non-limiting example, wherein:

FIG. 1 shows a diagram of a sensor element,

FIG. 2 shows a circuit configuration including the sensor element of FIG. 1, FIG. 3 shows a sensor element in a first operating condition, FIG. 4 shows a sensor element in a second operating condition, FIG. 5 shows a diagram of the electric potential level in the sensor element in the first operating condition of FIG. 3, FIG. 6 shows a diagram of the electric potential level in the sensor element in the second operating condition of FIG. 4, FIG. 7 shows a perspective view of a sump for a household appliance according to the present invention, provided with a sensor assembly, FIG. 8 shows a perspective view of the sump of FIG. 7 from a different angle, FIG. 9 shows a perspective view of the sump of FIG. 7, partially sectioned, FIG. 10 shows a side view of the sump of FIG. 7, FIG. 11 shows a top view of the sump of FIG. 7, FIG. 12 shows a sectional view according to the axis B-B of FIG. 11, FIGS. 13 and 14 show some detailed views of different positionings of the sensor assembly of the sump of FIG. 7, FIG. 15 shows a sectional top view of the sensor assembly of the sump of FIG. 7, FIGS. 16 and 17 show some views of the sensor assembly of the sump of FIG. 7 from different angles, FIG. 18 shows a perspective view of a first embodiment example of a component for a household appliance, according to the present invention, applied to a sump of a household appliance, FIG. 19 shows a perspective view of the component and of the sump of FIG. 18 from a different angle, FIG. 20 shows a top view of the component and of the sump of FIG. 18, FIG. 21 shows a sectional view according to the axis A-A of FIG. 20, FIGS. 22, 23, 24 show some views from different angles of the component of FIG. 18, FIG. 25 shows a first version according to the present invention, FIGS. 26, 27 and 28 show some perspective views from different angles of a detail of the component according to the present invention, FIG. 29 shows a second version according to the present invention, FIGS. 30 and 31 show some perspective views from different angles of a third version according to the present invention;

FIGS. 32 and 33 show a perspective view and a top view, respectively, of a detail of a component shown in FIGS. 30 and 31.

DETAILED DESCRIPTION OF EMBODIMENTS OF THE INVENTION

Referring now to the drawings, FIG. 1 shows a diagram of a sensor element 1 comprising a light transmitter Tx, in particular a photodiode, adapted to generate a light beam F, and a light receiver Rx, in particular a phototransistor, adapted to receive said light beam F.

FIG. 2 shows a circuit configuration comprising the sensor element 1; as illustrated, the light transmitter Tx and the light receiver Rx are connected to a positive power supply line +, in particular through respective resistors R1 and R2, and to a negative power supply line −.

Additionally, the light receiver Rx, in particular the phototransistor collector, is connected to a terminal Vout; the potential difference between the terminal Vout and the negative power supply line − is indicative of the light received by the light receiver Rx; therefore, the terminal Vout can be used for detecting an electric signal corresponding to the light beam F emitted by the light transmitter Tx.

FIGS. 3 and 4 show the sensor element 1 in a first operating condition and in a second operating condition, respectively, in both operating conditions said sensor element 1 facing a transparent optical element 2, adapted to affect the light beam F emitted by the light transmitter Tx in a different way depending on the content of a tub V of a household appliance, not shown in the drawings.

The transparent optical element 2 shown in the drawings has a substantially triangular cross section and comprises a first inclined surface 2A and a second inclined surface 2B; in practice, it is a triangular prism. Said prism may be associated with or built in another element, e.g. a substantially flat plate, and form a body (e.g. one piece); in this case, said body will be applied or fitted on or built in the container.

In said first operating condition, the tub V contains a liquid L, shown in the drawing by means of dashed lines; the light beam F reaches the first inclined surface 2A, goes beyond it and is then substantially absorbed or deflected by the liquid L. It follows that, in said operating condition, i.e. when the level of the liquid L in the tub reaches the transparent optical element 2, the light beam F is not reflected by the inclined surfaces 2A, 2B and, as a result, it does not reach the light receiver Rx.

Vice versa, in said second operating condition, corresponding to the representation of FIG. 4, the tub V is empty. On the inclined surfaces 2A, 2B, a double reflection of the light beam F emitted by the light transmitter Tx takes place; consequently, the light beam F reaches at least partially the light receiver Rx.

FIGS. 5 and 6 show the electric potential levels at the terminal Vout (compared to the electric potential of the negative power supply line −) of the circuit of FIG. 2, in the first operating condition (FIG. 3) and in the second operating condition (FIG. 4) respectively.

When the phototransistor is not receiving any light (FIG. 3/FIG. 5), the connection between its collector terminal and its emitter terminal substantially corresponds to an open circuit; therefore, the potential at the terminal Vout substantially will be equal to the potential on the positive power supply line +; of course, there will be a voltage drop (generally small) on the resistor R2.

When the phototransistor is receiving light (FIG. 4/FIG. 6), the connection between its collector terminal and its emitter terminal substantially corresponds to a short circuit; therefore, the potential at the terminal Vout substantially will be equal to the potential on the negative power supply line −; actually, between the collector terminal and the emitter terminal there will be a potential difference (quite small) usually referred to with the abbreviation $VCE_{SAT}$.

By connecting a simple voltage comparator circuit downstream of or at the terminals of the circuit of FIG. 2, it is easy to discriminate between the two above-mentioned conditions on the basis of the voltage between the terminal Vout and the negative power supply line −.

FIGS. 7, 8 and 9 show different perspective views of a sump 10 for a household appliance, in particular for a dishwasher, according to the present invention.

Said sump 10 comprises a container C adapted to contain a liquid, a sensor assembly 11 comprising a sensor element 1 provided with a light transmitter T adapted to generate a light beam, and a light receiver R adapted to receive said light beam, in particular said sensor element 1 being fitted on a printed circuit CS through respective hooking elements.

The sump 10 also comprises an optical element 12, in particular made of a transparent material, adapted to affect the light beam emitted by the light transmitter T depending on the content of said container C.

In the present description, the term "transparent" is used to indicate transparency to the radiation or to the wave length of said light beam, which may even be invisible, emitted by the light transmitter; for example, let us consider an emission within the infrared spectrum or a laser beam. Consequently, even materials seemingly not transparent or even opaque may turn out to be transparent to said light beam.

In accordance with the present invention, said optical element 12 is built in or fitted on said container C, said optical element 12 comprising a prism which may be either solid or hollow.

As shown in particular in the representations of FIGS. 7 and 9, the optical element 12 is projecting from an inner surface 13 of the container C; alternatively, the optical element 12 may be so provided as to be recessed in said inner surface 13 of the container C, i.e. the optical element 12 may have different shapes than described herein by way of non-limiting example.

The optical element 12 is adapted to reflect the light beam in different ways depending on the content of said container C.

In particular, when the container C contains a liquid which level is higher than the level where the sensor assembly 11 is fitted, the light beam emitted by the light transmitter T will be absorbed or deflected by the liquid, and therefore it will not reach the light receiver R.

Vice versa, if the container C is empty or the level of the liquid in the container C is lower than that where the sensor assembly 11 is fitted, the light beam emitted by the light transmitter T will be reflected by the optical element 12 and will reach the light receiver R at least partially.

It is therefore clear that by coupling the sensor assembly 11 to the optical element 12 it is possible to detect if in the container C of the sump 10 there is liquid at a level corresponding to the position of the sensor assembly 11.

Furthermore, the optical element 12 preferably comprises a plate, preferably a strip, being substantially flat and made of or obtained from a transparent material, i.e. it preferably comprises at least a portion of the surface 13 of the container C.

Said optical element 12 may advantageously be manufactured separately and then secured to said container C or sump 10, e.g. by using engaging means and an interposed sealing element, or else be welded or glued thereto.

In a preferred embodiment of the present invention, the container C is wholly or partially made of or obtained from a transparent material, and the optical element 12 is preferably made of the same transparent material.

Still with reference to the representations of FIGS. 7 and 9, it can be noted that the optical element 12 has an elongated shape and extends in a substantially vertical direction relative to the installation or extension plane of said container C.

It is clear that, thanks to such a shape of the optical element 12, it is possible to use, for example, a plurality of sensor assemblies 11, in particular at least two sensor assemblies 11, in order to be able to detect two distinct filling levels of the container C of the sump 10, or else a single sensor assembly 11 can be easily located at different heights both during the assembling operations and during any subsequent level calibration or adjustment.

For said calibration, the sensor assembly 11 and/or the sump 10 may advantageously be fitted with respective coupling elements (not shown) adapted to allow for a fine or precise positioning. Thus, during said calibration stage it is possible to, for example, fill the container C with a known volume of liquid, and then to position the sensor assembly 11 at the top level of said liquid; by so doing, any tolerances in the volume of the container C can be compensated for. As known, in fact, during the moulding process a product made of a thermoplastic material may undergo dimensional variations due to shrinkage occurring during the cooling step.

As an alternative, the optical element 12 may have an elongated shape extending in a substantially horizontal direction relative to the installation or extension plane of said container C; this arrangement allows, for example, to perform a double check of the same filling level of the container C of the sump 10.

In any case, the optical element 12 should preferably be provided with an elongated shape extending substantially for the whole length or width or height of said surface 13 of the container C or for a significant part thereof; such an arrangement of the optical element 12 facilitates the moulding process and also makes it easier to position the sensor assembly 11 for detecting a predetermined liquid level in the sump 10.

It is apparent that the sump 10 for a household appliance, in particular for a dishwasher, according to the present invention may comprise a plurality of hydraulic ducts or fittings, in particular:

a supply duct 14 for admitting a liquid L, in particular water, coming from the mains, into the sump 10;
a drain duct 15 for draining the liquid L from the sump 10;
a recycle duct 16, for hydraulically connecting the sump 10 to wash jets of the machine for washing.

Some portions of said sump 10 may advantageously be so shaped as to provide portions of other devices as well, e.g. pumps or solenoid valves or diverting valves or actuators or other types of sensors.

In the present embodiment example, the sump 10 comprises an edge 17 having a pair of raised walls 18, 19 adapted to provide an outer seat adapted to house a gasket (not shown in the drawings) and/or adapted to be welded to the lower portion of the wash tub V of a washing machine, in particular a dishwasher.

Said sump 10, in particular the edge 17 of said sump 10, may also comprise additional fastening means for fixing it to a machine for washing and/or to its wash tub V, e.g. a plurality of holes F adapted to accommodate screws or similar fastening means, not shown in the drawings.

FIGS. 10 and 11 show a side view and a top view, respectively, of the sump 10, while FIG. 12 shows a sectional view of the sump 10 according to the axis B-B of FIG. 11.

Said figures clearly show that the sump 10 comprises a seat or casing S adapted to accommodate the sensor assembly 11, which comprises said printed circuit CS provided with electric contacts for the electric connection of said sensor assembly 11 to an electric wiring or to an electric connector.

In order to improve the protection of the sensor assembly 11, the seat or casing S may be made hermetic, e.g. filled with resin, or overmoulded with thermoplastic material, or closed with a welded or glued cover.

In a preferred embodiment of the present invention, the printed circuit CS is so shaped as to provide, through its traces, a male electric connector which can be coupled to a connector CON of the wiring of the machine for washing.

Additionally, said printed circuit CS may comprise polarization means adapted to prevent an inverse connection of the sensor assembly 11.

FIGS. 13 and 14 show some detailed views of the sensor assembly 11, in particular according to different positionings relative to the sump 10.

As shown in said figures, the seat or casing S of the sump 10 comprises a plurality of fixing seats, in particular a first pair of fixing seats 20A and a second pair of fixing seats 20B, the first pair of fixing seats 20A being located higher than the second pair of fixing seats 20B.

As a result, said fixing seats 20A, 20B allow to assemble the sensor assembly 11 in at least two different and preferably predefined positions.

In particular, it can be noticed that the fixing seats 20A, 20B consist of apertures adapted to accommodate fixing means, e.g. screws 20C.

It is clear that the seat S of the sump 10 may comprise a larger number of pairs of fixing seats 20A, 20B, as well as that said pairs of fixing seats 20A, 20B may also be provided as vertical or horizontal slots, so that the sensor assembly 11 can be assembled on said adjustable position.

FIG. 15 shows a sectional top view of the sensor assembly 11 and of a portion of the sump 10, whereas FIGS. 16 and 17 respectively show a side view and a front view of the sensor assembly 11, connected to said wiring CON.

As shown in said figures, the transmitter T and the receiver R make up an optical detection pair, preferably for detecting a liquid level in the sump 10.

Said optical detection pair faces the optical element 12, which, as aforementioned, is adapted to affect the light beam emitted by the light transmitter T in different ways depending on the content of the sump 10. When the level of the liquid in the sump 10 reaches the level at which the optical detection pair is located, the light beam is substantially absorbed or deflected by the liquid, and therefore it does not reach the light receiver R; vice versa, when the level of the liquid in the sump 10 does not reach the level at which the optical detection pair is located, the optical element 12 reflects the light beam, so that it reaches the light receiver R at least partially.

Clearly, the sump 10 may comprise at least two optical detection pairs, preferably for detecting two or more different liquid levels in the sump 10; said at least two optical detection pairs may be supported by the same sensor assembly 11 or else by at least two respective sensor assemblies 11.

Moreover, the sump 10 may be so provided as to comprise an electric or electronic module comprising said light transmitter T and said light receiver R.

In particular, said module may also comprise an electronic processor, preferably a microcontroller, connected to said light transmitter T and to said light receiver R; in addition, said module typically and advantageously comprises a printed circuit provided with electric contacts for the electric connection of said module to an electric wiring or to an electric connector, of the male, female or mixed type, of the machine of washing.

FIGS. 18 to 21 show different views of a first embodiment example of a component 100' adapted to be at least partially applied to or associated with a sump 10' of a household appliance, in particular a dishwasher, adapted to contain at least a portion of a wash liquid, wherein said sump 10' comprises a container C' adapted to contain said liquid.

The same reference numbers will sometimes also be used in the subsequent examples, in particular with the addition of an apostrophe or a double apostrophe, to designate elements corresponding to those of the preceding example, i.e. equivalent elements.

The component 100' comprises:
a light transmitter T' adapted to generate a light beam,
a light receiver R' adapted to receive said light beam,
an optical element 112', in particular made of a material being at least partially transparent, adapted to affect said light beam depending on the content of said container C'.

The component 100' is adapted to detect at least one liquid level in said container C'. In particular, the light transmitter T' and the light receiver R' make up an optical pair 111' and face the optical element 112', which is adapted to reflect or deflect said light beam differently depending on the content of the container C'. When the level of the liquid in the container C' reaches the level at which the optical pair 111' is located, the light beam emitted by the light transmitter T' is substantially absorbed or deflected by the liquid and therefore it does not reach the light receiver R'; vice versa, when the level of the liquid in the container C' does not reach the level at which the optical pair 111' is located, the optical element 112' reflects or deflects the light beam emitted by the light transmitter T', so that it reaches the light receiver R' at least partially.

Figure 22:
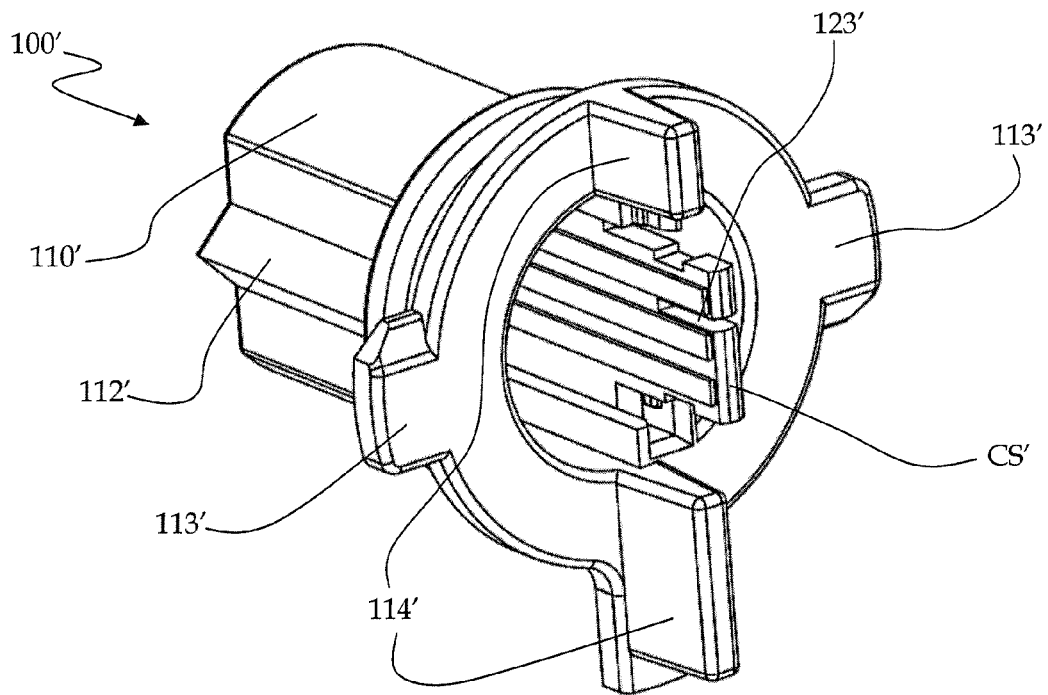

With reference to FIGS. 22, 23 and 24, said optical element 112' is a solid or an at least partially hollow prism, and is projecting (as shown in the drawings) or recessed relative to an outer surface or casing of the component 100'. Said optical element 112' may also be so provided as to comprise a plate, preferably a strip, being substantially flat and made of a transparent material.

It is clear that the term "prism" refers to any shape of the optical element being adapted to reflect or deflect the light beam emitted by the light transmitter T', while the term "hollow" refers to the presence of any cavity relative to a respective plane or to the plane of the surface 13 of the container C'.

The optical element 112' preferably comprises at least one substantially flat wall, in particular facing the light transmitter T' and the light receiver R'.

In particular, the component 100' comprises a body or casing 110' adapted to be located at least partially inside said container C' of the sump 10' through an aperture being present in at least one of the surfaces 13' of the sump 10'.

Said optical element 112' may advantageously be manufactured separately and then secured to said body or casing 110', e.g. by using engaging means and an interposed sealing element, or else be welded or glued thereto.

Preferably, said body or casing 110' is at least partially made of a transparent material, which forms at least a portion of said optical element 112'.

The body or casing 110' may have a substantially hollow shape, e.g. cylindrical or prismatic. The optical element 112', located in or on said body or casing 110', is preferably arranged in a direction being substantially parallel to the axis of said body or casing 110', or in a direction being substantially perpendicular to the surface 13' whereto the optical element 112' is secured.

However, the optical element 112' may also be provided or located in another position (not shown) in or on said body or casing 110', for example on an end surface 118'; the optical element 112' may therefore be arranged in a direction being substantially perpendicular to the axis of said body or casing 110', or in a direction being substantially parallel to the surface 13' whereto the optical element 112' is secured, or else parallel or perpendicular to at least a portion of the bottom surface of the sump.

The sump 10' for a household appliance, in particular for a dishwasher, according to the present invention, is substantially made like the sump 10 described previously; consequently, FIGS. 18, 19, 20 and 21 will include the same reference numbers already used for the sump 10, with the addition of an apostrophe.

As shown in FIGS. 18 and 19, at least one surface 13' of the sump 10' has an aperture through which the body or casing 110' of the component 100' is inserted, so that it can be positioned at least partially inside said container C' of the sump 10'.

Said surface 13' comprises a plurality of retaining elements 30', adapted to cooperate with coupling or engaging means 113' being present on the component 100' in order to couple said component 100' to the sump 10'.

As shown in FIG. 18, said retaining elements 30' of the sump 10' comprise reliefs 30'; said reliefs 30' substantially have an "L" shape, in that they comprise a first portion 30'A extending from the surface 13' of the sump 10' and a second portion 30'B extending from said first portion 30'A.

FIGS. 22, 23 and 24 provide a better view of the coupling or engaging means of the component 100', which comprise lugs 113'.

The cooperation between the reliefs 30' and the lugs 113' allows to apply said component 100' to said sump 10' through a bayonet-type fitting, i.e. a quick coupling; in fact, once the body or casing 110' has been inserted into the container C' of the sump 10', the component 100' is turned until the tabs 113' are retained by the second portion 30'B of the reliefs 30'. For this purpose, the component 100' advantageously comprises a plurality of grip elements 114', which make it easier to turn the component 100' and, consequently, to couple it to the sump 10', said grip elements 114' being suitable for being handled manually or for being coupled to an installation tool.

It is apparent that the component 100' may also be coupled to the sump 10' in other ways, e.g. through means adapted to allow it to be applied to said sump 10' by screwing or welding or fitting or glueing; preferably, said coupling is provided through means which allow said component 100' to be removed, e.g. in order to facilitate maintenance operations, but said coupling may however be advantageously provided through means which make said component 100' irremovable.

For example, FIG. 25 shows an alternative system for obtaining a secure coupling between the component 100' and the sump 10', in particular through a snap-type or quick fitting in a substantially linear direction.

The above-mentioned figure clearly shows the L-shaped reliefs 30', which comprise the first portion 30'A extending from the surface 13' of the sump 10' and the second portion 30'B extending from said first portion 30'A.

The component 100' comprises engaging means, in particular elastic tongues 115', adapted to cooperate with the reliefs 30' for fixing the component 100' to the sump 10'. In fact, said elastic tongues 115' comprise an engaging projection or seat 116' adapted to be coupled to and/or abutted on the second portion 30'B of the reliefs 30'.

The component 100' also comprises sealing means, in particular a gasket 117', which prevents the liquid from leaking out of the container C' when the component 100' has been secured to the sump 10'.

It is clear that, in order to remove the component 100' from the sump 10', it will be necessary to apply pressure to the elastic tongues 115', thus disengaging the projection 116' from the second portion 30'B of the reliefs 30'.

Said body or casing 110', 110" may also comprise said coupling or engaging means 113', 115', 116', preferably provided in one piece, in particular by moulding a thermoplastic material.

The component 100' additionally comprises a support and/or fixing element for the optical pair 111', comprising the light transmitter T' and the light receiver R'; said support and/or fixing element typically comprises a printed circuit CS', in particular as shown in FIGS. 26 to 28.

The printed circuit CS' comprises or provides an electric connector 119', e.g. consisting of electric contacts or terminals 120', adapted to be connected or wired electrically to the user apparatus, in particular for supplying power to the optical pair 111' or to other elements of the component 100' and for the detection and transmission of the respective signal Vout.

The printed circuit CS' is so shaped as to comprise two seats or two slots 121', located at said electric terminals 120', for coupling the printed circuit CS' to a respective electric connector CON or to the electric wiring of the user apparatus, typically a household appliance, said electric connector CON of the wiring being fitted with respective engaging means adapted to be engaged into said seats 121'. It should be pointed out that the printed circuit CS' has a plurality of steps or reliefs 122', adapted to be latched to and/or abutted on respective means being present inside the body or casing 110' or inside the component 100', in particular in order to provide an anti-removal device and to ensure an accurate positioning of the optical pair 112' inside the component 100', in particular relative to the body or casing 110' and/or to the optical element 112'.

The component 100' also comprises coupling means, adapted to provide a univocal coupling between said printed circuit CS' and an electric connector CON or the electric wiring of the user apparatus, typically a household appliance. In the embodiment shown in FIGS. 26 to 28, the printed circuit CS' is so shaped as to comprise said coupling means, in particular at least one polarization seat 123', adapted to cooperate with respective means provided on said electric connector CON or with the electric wiring of the user apparatus.

Said optical sensor 111' and/or the printed circuit CS' may be advantageously protected, i.e. sealed inside the body or casing 110'; the possible presence of holes (not shown) in the printed circuit CS' facilitates the distribution of insulating or filling material, such as resin poured into a casing seat, such as said body or casing 110', wherein the printed circuit CS', with its electric and/or electronic components, is inserted.

FIG. 29 shows a further possible embodiment of the coupling means between said printed circuit CS' and an electric connector or the electric wiring of the user apparatus, typically a household appliance.

In fact, according to said embodiment the component 100' comprises a connector 130' of a known or available type, e.g. of the type commonly defined as "Rast 2.5".

Preferably, at least a portion of the connector 130' is made of an electrically insulating thermoplastic material, and is built in or adapted to be coupled to said casing 110', possibly engaged with the end portion of the printed circuit CS', e.g. through hooks or projecting elements being present inside said connector 130', which engage in respective holes or seats of the printed circuit CS'; it should also be considered that said printed circuit CS is coupled to the component 100' through said reliefs or steps 122'.

Said connector 130' comprises engaging elements 131' to be coupled to an electric connector CON' of the electric wiring of the user apparatus; in particular, said electric connector CON' comprises suitable seats 141' adapted to house the engaging elements 131'.

The connector 130' comprises first polarization means, in particular seats 132' adapted to prevent an improper connection to the electric wiring.

The electric connector CON' of the wiring, from which three electric wires 150' come out, comprises second polarization means or reliefs 142' adapted to be coupled to the seats 132' of said connector 130' in order to ensure a univocal mechanic and electric coupling between said wiring and the component 100'.

Said polarization means 132', 142' are adapted to prevent an inverse connection of the component 100'.

According to a version not shown in the drawings, the connector 130' may be an element being distinct from said component 100' and may be fitted with external engaging elements, adapted to be coupled to the component 100' so as to provide a known or commonly available adapter, e.g. of the type defined as "Rast 2.5".

As aforementioned, the transmitter T' and the receiver R' make up an optical pair 111', preferably for detecting at least one liquid level in the sump 10'; said optical pair 111' may be assembled or built in a single electronic component 1 or else it may consist of a plurality of distinct electronic components assembled on a single electronic circuit.

It is clear that the component 100' may comprise at least two optical detection pairs, preferably for detecting two different liquid levels, said at least two optical pairs using the same optical element 112'; alternatively, the component 100' may be so provided that the light transmitter T' and the light receiver R' can be fitted on at least two different and preferably predefined positions.

The sump 10' may be so provided that said component 100' is assembled on an adjustable position, said position being preferably angular, and/or that three or four different and preferably predefined positions are available, said positions being preferably angular and displaced by 90°; said angular position may, for example, be obtained by turning the component 100' about its axis.

Moreover, the sump 10' and/or the component 100' may be so provided as to comprise an electric or electronic module comprising said light transmitter T' and/or said light receiver R'.

In particular, said module may comprise an electronic processor, preferably a microcontroller, connected to said light transmitter T' and to said light receiver R'; in addition, said module may comprise a suitable connector or a printed circuit provided with electric contacts for the electric connection of said module to an electric wiring or to an electric connector, of the male, female or mixed type, of the machine of washing.

Said electric or electronic module may also be adapted to control the component 100' or the sump 10', e.g. as a local controller, by operating as an interface to the control system of the household appliance, not shown.

It is clear that many changes may be made by those skilled in the art to the above-described component and sump for household appliances.

Among the possible versions, it should be mentioned that the above-described component 100' may be so modified as to obtain a component, designated by reference number 100" in FIGS. 30 and 31, adapted to be at least partially applied to or associated with a sump of a household appliance, in particular a washing machine, typically a dishwasher, said sump being adapted to contain at least a portion of a wash liquid and comprising a container adapted to contain said liquid.

Note that the sump is not shown in FIGS. 30 and 31, in that it is essentially similar to the sump 10'.

As shown also in FIGS. 32 and 33, the component 100" comprises:

a first optical pair 111A" comprising a light transmitter T" adapted to generate a light beam, a light receiver R" adapted to receive said light beam, and a first optical element 112A", in particular made of a transparent material, facing said first optical pair 111A" and adapted to affect said light beam depending on the content of said container;

a second optical pair 111B" comprising a light transmitter T'" adapted to generate a light beam, a light receiver R'" adapted to receive said light beam, and a second optical element 112B", in particular made of a material being at least partially transparent, facing said second optical pair 111B" and adapted to affect said light beam depending on the content of said container;

The component 100" is adapted to detect two distinct liquid levels in the sump container, in particular a first load level and a second safety level, e.g. said second safety level allowing to indicate the presence of an excessive quantity of liquid in the container of said sump.

Should the component 100" be inserted into the container so that both optical elements 112' and 112" were directed downwards or upwards, said component 100' would be adapted to perform a double check of the same liquid level in the sump container, e.g. in order to prevent any malfunctioning due to dirt and/or limescale deposits on one of said optical elements 112A" and 112B".

Said optical elements 112A" and 112B" are either solid or hollow prisms, and are either projecting or recessed relative to an outer surface of the component 100". Alternatively, said optical elements 112A" and 112B" comprise one plate each or a single common plate, preferably a strip, being substantially flat and made of a transparent material.

In particular, the component 100' comprises a body or casing 110" adapted to be located wholly or partially inside the container of the sump. In the embodiment example shown in FIGS. 30 and 31, the body or casing 110" has a substantially an oval section; more in general, said section may have an elongated shape and preferably a perimeter with no sharp edges, i.e. with at least partially rounded perimeter portions, in order to ensure a good seal in respect to a sealing element 117" of the sensor 100". Preferably, the sump seat wherein said component is to be housed and/or inserted shall have a complementary shape to that of the body or casing 110", e.g. an oval or elongated section, preferably with no sharp edges and/or being at least partially rounded.

Preferably, said body or casing 110" is at least partially made of a transparent material, and said optical elements 112A" and 112B" are located in or on said body or casing 110" and are preferably made of the same transparent material. Furthermore, the optical elements 112A" and 112B" are located in or on said body or casing 110" and are arranged in a direction being substantially parallel to the axis of said body or casing 110", i.e. perpendicular to an end surface 118" of the body or casing 110".

The coupling between the component 100" and the sump of the household appliance preferably takes place through a snap-type fitting or a preferably quick coupling, as described with reference to FIG. 25. In fact, the component 100" comprises engaging means as well, in particular elastic tongues 115" provided with projections 116", for securing the component 100" to the sump.

For the purpose of preventing the liquid from leaking out of the tub, the component 100" comprises sealing means, in particular a gasket 117".

Said body or casing 110", i.e. said component 100", is shown as having a mostly oval section and an elongated shape; however, said shape or section may be different, e.g. circular or squared in some areas. Aiming at improving water tightness, the section or profile preferably has no sharp edges in the area corresponding to said sealing means 117", i.e. the profile is at least partially curved.

The component 100" also comprises a support and/or fixing element for the first optical pair 111A" and the second optical pair 111B", said support and/or fixing element typically comprising a printed circuit CS", as shown in particular in FIGS. 32 and 33.

The printed circuit CS" comprises or provides an electric connector 119", e.g. consisting of a plurality of electric contacts or terminals 120", adapted to be connected or wired electrically to the user apparatus, in particular for supplying power to the optical pairs 111A", 111B" and/or to other elements of the component 100" as well as for the detection and transmission of the signals Vout.

The printed circuit CS" is essentially shaped like the one described with reference to FIGS. 26, 27, 28, in that it comprises:

two seats or two slots 121" for coupling the printed circuit CS" to a respective electric connector or to the electric wiring of the user apparatus, typically a household appliance, said electric connector of the wiring being fitted with respective engaging means adapted to be engaged into said seats 121";

a plurality of steps 122", adapted to be latched to and/or abutted on respective means being present inside the body or casing 110" or inside the component 100", in particular in order to provide an anti-removal device and to ensure an accurate positioning of the optical pairs 111A", 111B" inside the component 100", in particular relative to the body or casing 110" and/or to said optical elements 112A" and 112B";

coupling means, in particular a polarization seat 123", adapted to provide a univocal coupling between said printed circuit CS" and an electric connector or the electric wiring of the user apparatus, typically a household appliance. According to another version (not shown in the drawings), the sensor assembly 11 and/or the component 100', 100" may be so provided as to comprise a number of light transmitters T, T', T' being different from the number of light receivers R, R', R", e.g. a single light transmitter T, T', T" and a plurality of light receivers R, R', R". In said version, the optical elements 12', 112', 112" may also have a different shape from the one previously described, e.g. a shape adapted to deflect a single light beam toward different light receivers R, R', R" depending on different levels of the liquid being present in the containers C, C'. According to a further version, not shown, the sensor assembly 11 may be so provided as to comprise a transparent casing or a casing which is open at one end. Such a version would allow to assemble the sensor assembly 11 very easily into the seat or casing S of the sump 10 so that it faces the optical element 12.

According to another version, the polarization means of the sensor assembly 11 and/or of the component 100', 100" may be so provided that each connector has a different coding, i.e. a different arrangement of the coding seats and reliefs, so as to prevent said sensor assembly 11 and/or said component 100', 100" from being connected to a wrong connector possibly being present in the household appliance.

In the above description of the various examples of embodiments, reference was often made to the possibility of fixing elements according to the present invention (e.g. between parts of the sump, such as prism on the sump or component on the sump, or between parts of the component, etc.) by welding; a known type of welding which is particularly suited to the present invention (although it is not the only admissible one) is laser welding between thermoplastic elements, e.g. welding a first thermoplastic material being transparent to the laser beam to a second material which heats up when hit by said laser beam, in order to obtain a local melting and joint of said two thermoplastic materials.

Another innovative aspect of the present invention relates to a calibration and/or adjustment method; the general idea at the basis of said method can be applied to a component (according to the present invention) adapted to detect at least one liquid level in a container, as well as to a sump (according to the present invention) comprising a container and adapted to detect at least one liquid level in said container. Said method can be carried out either during the production stage or during the installation stage.

As far as the component is concerned, it comprises at least one body, one light transmitter, one light receiver and one optical element; according to the calibration and/or adjustment method, the position of the light transmitter and/or of the light receiver and/or of the optical element is changed relative to the component body.

The position change may be made by acting on coupling elements adapted to allow for at least one fine or precision positioning, in particular by turning at least one calibration and/or adjustment screw; note that these coupling elements are not shown in the drawings.

Typically, the position of the light transmitter and the position of the light receiver are both changed preferably to the same extent and preferably simultaneously. If the light transmitter and the light receiver are supported by and/or fixed to a support and/or fixing element, typically a printed circuit, the change in the positions of the light transmitter and of the light receiver may advantageously be obtained by changing the position of the support and/or fixing element.

As far as the sump is concerned, it comprises a container, a light transmitter, a light receiver and an optical element; according to the calibration and/or adjustment method, the position of the light transmitter and/or of the light receiver and/or of the optical element is changed relative to the container of the sump. Typically, before the position is changed, the container is filled with liquid up to the level to be detected, after which the position is changed accordingly. The position change may be made by acting on coupling elements adapted to allow for at least one fine or precision positioning, in particular by turning at least one calibration and/or adjustment screw; note that these coupling elements are not shown in the drawings.

Typically, also in this case, the position of the light transmitter and the position of the light receiver are both changed preferably to the same extent and preferably simultaneously. If the light transmitter and the light receiver are supported by and/or fixed to a support and/or fixing element, typically a printed circuit, the change in the positions of the light transmitter and of the light receiver may advantageously be obtained by changing the position of the support and/or fixing element. If the light transmitter, the light receiver and the optical element are comprised or built in a component, the change in the position of the light transmitter, the light receiver and the optical element is obtained by changing the position of said component; said change of position may be at least partially angular and/or linear.

The features and advantages of both the component for a household appliance, in particular for a dishwasher, adapted to be applied to a sump of said household appliance, and of the sump for household appliances according to the present invention are apparent from the above description.

In particular, said component provides an optical tool for detecting and controlling the level of a liquid in a household washing machine, in particular a dishwasher, which can be applied effectively and efficiently in particular to the sump of the machine for washing. Furthermore, said sump fitted with an optical sensor assembly provides an effective and efficient solution for use in machines for washing.

Among the various advantageous technical features of the present invention, i.e. of the component and the sump, the most important ones are as follows:

- the optical level sensor can be easily coupled and/or assembled on a sump, in particular of a household appliance;
- the optical level sensor can be easily coupled and/or assembled on a household appliance, in particular a dishwasher, thanks to the sensor being built in or fitted on the sump;
- presence of at least one seat or hole in a sump, in particular of a household appliance, preferably a dishwasher, for housing the sensor;
- possibility of performing a calibration or adjustment of the position or of the level detection threshold of the component and/or of the sump according to the present invention;
- partial (e.g. the prism or an equivalent element) or total integration of an optical sensor, preferably a level sensor, in a sump, in particular of a household appliance, preferably a dishwasher;
- possibility of forming or assembling the optical sensor at least partially during the sump manufacturing process;
- possibility of detecting more than one level with a single component by using one or more reflecting optical elements, e.g. obtained in the same casing;
- possibility of detecting more than one level in a single sump by using one or more reflecting optical elements;
- effective and efficient use of a sensor assembly with transmitter and receiver inserted or built in a single component or circuit;
- quick coupling means for the component and/or the sump;
- polarization and/or engaging means on the electric connector of the component and/or sump;
- integration of the whole optical sensor control electronics, or a part thereof, into the component and/or sump.

The advantages of the present invention are apparent in the light of the above description, as well as it is clear that the present invention may be subject to many construction variations, in particular from the mechanic, electric and electronic point of views, and to many application variations with respect to the above described solutions. The technical features of the above-described versions or examples may be present even partially or in a higher number, and they may be at least partially combined with one another in order to obtain devices being different from those illustrated herein by way of example.

The invention claimed is:

1. Component (100', 100") for a household appliance adapted to be at least partially associated with a one of a container and a sump (C', 10') of the household appliance adapted to contain at least a portion of one of a liquid and a wash liquid, said component (100', 100") comprising:
   a light transmitter (T', T", T''') adapted to generate a light beam,
   a light receiver (R', R", R''') adapted to receive said light beam, and
   at least one optical element (112', 112A", 112B") made of a material being at least partially transparent, adapted to affect said light beam depending on the content of said container (C'), said optical element comprising a prism, and
   a body (110', 110") at least partially made of a transparent material, which forms at least a portion of said optical element (112', 112A", 112B"), said body further comprising one or more of a support and a fixing element for one or more of said light transmitter (T') and said light receiver (R').

2. Component (100', 100") according to claim 1, characterized by being adapted to detect at least one liquid level in said container (C').

3. Component (100', 100") according to claim 1, characterized in that said optical element (112', 112A", 112B") is adapted to reflect or deflect said light beam differently depending on the content of said container (C').

4. Component (100', 100") according to claim 1, characterized in that said optical element (112', 112A", 112B") is a prism and is positioned relative to an outer surface of said component (100', 100").

5. Component (100', 100") according to claim 1, characterized in that said optical element (112', 112A", 112B") comprises a plate being substantially flat and made of a transparent material.

6. Component (100', 100") according to claim 1, characterized in that said optical element (112', 112A", 112B") comprises at least one substantially flat wall facing the light transmitter (T') and the light receiver (R').

7. Component (100', 100") according to claim 1, characterized by comprising a body (110', 110") adapted to be located at least partially inside said container (C').

8. Component (100', 100") according to claim 1, characterized by comprising a body (110', 110") adapted to be at least partially associated with said sump (10, 10'), said body (110', 110") having a hollow shape, and wherein said optical element (112', 112A", 112B") is located in or on said body (110', 110").

9. Component (100', 100") according to claim 1, characterized by comprising coupling means (113', 115', 116'; 115") adapted to allow the component to be operatively applied to said sump (10, 10').

10. Component (100', 100") according to claim 9, characterized in that said coupling means (113', 115', 116'; 115", 116") comprise one of lugs (113') or elastic tongues (115', 115") which allow said component (100', 100") to be applied to said sump (10, 10') through a bayonet-type or catch-type mounting.

11. Component (100', 100") according to claim 9, characterized in that said retaining elements (30', 30'A, 30'B) comprise L-shaped reliefs (30') and comprise a first portion (30'A) extending from a surface (13') of the sump (10, 10') and a second portion (30'B) extending from said first portion (30'A).

12. Component (100', 100") according to claim 9, characterized in that said body (110', 110") comprises said coupling means (113', 115', 116'; 115").

13. Component (100', 100") according to claim 1, wherein said light transmitter (T', T", T''') and said light receiver (R', R", R''') make up one or more optical detection pairs (111'; 111A", 111B"), each pair for detecting at least one liquid level.

14. Component (100', 100") according to claim 13, characterized in that each of said one or more optical detection pairs (111'; 111A", 111B") comprises one or more electronic component (1).

15. Component (100', 100") according to claim 13, characterized by comprising a support element for the one or more optical detection pairs (111'; 111A", 111B"), said support including electric means (120', 120") for supplying power and for detection and transmission of a respective signal (Vout).

16. Component (100', 100") according to claim 13, characterized in that a printed circuit (CS', CS") of the component (100', 100") comprises hooking means in the form of one of steps or reliefs (122', 122") adapted to be coupled to on respective means present inside the component (100', 100"), in order to provide an anti-removal device and to ensure an accurate positioning of the one or more optical detection pairs (111'; 111A", 111B") inside the component (100', 100").

17. Component (100', 100") according to claim 1, characterized in that the position of one or more of said light transmitter (T', T", T''') and of said light receiver (R', R", R''') can be adjusted, through installation in at least one seat.

18. Component (100', 100") according to claim 1, characterized by comprising coupling elements adapted to allow for precision positioning of said component (100', 100"), so that it can be adjusted as to the liquid level definition.

19. Component (100', 100") according to claim 1, characterized in that a printed circuit (CS', CS") of the component (100', 100") comprises coupling means (123', 130') adapted to provide a univocal coupling between said printed circuit (CS', CS") and an electric connector or the electric wiring of the household appliance.

20. Component (100', 100") according to claim 1, characterized by comprising an electronic module, said module also comprising at least one of said light transmitter (T', T", T''') and said light receiver (R', R", R''') and an electronic processor.

21. Sump (10') for a household appliance, comprising a container (C') adapted to contain a liquid, characterized by comprising a component (100', 100") according to claim 1 mounted in or on said container (C').

22. Sump (10') according to claim 21, characterized in that said component (100', 100") is adapted to detect at least one liquid level in said container (C').

23. Sump (10') according to claim 22, characterized in that said component (100', 100") is operatively mounted in or on said container (C') through suitable retaining elements (30', 30'A, 30'B).

24. Sump (10') according to claim 22, characterized in that said component (100', 100") is mounted in an adjustable position.

25. Sump (10') according to claim 22, characterized in that said component (100', 100") is mounted in at least two different predefined positions.

26. Sump (10') according to claim 22, characterized in that said component (100', 100") comprises an optical element (112', 112A", 112B"), said optical element comprising prism.

27. Sump (10') according to claim 21, characterized in that said component (100', 100") is operatively mounted in or on said container (C') through retaining elements (30', 30'A, 30'B).

28. Sump (10') according to claim 27, characterized in that said component (100', 100") is mounted in an adjustable position.

29. Sump (10') according to claim 27, characterized in that said component (100', 100") is mounted in at least two different predefined positions.

30. Sump (10') according to claim 27, characterized in that said component (100', 100") comprises an optical element (112', 112A", 112B"), said optical element comprising prism.

31. Sump (10') according to claim 21, characterized in that said component (100', 100") is mounted in an adjustable position.

32. Sump (10') according to claim 31, characterized in that said component (100', 100") is mounted in at least two different predefined positions.

33. Sump (10') according to claim 31, characterized in that said component (100', 100") comprises an optical element (112', 112A", 112B"), said optical element comprising prism.

34. Sump (10') according to claim 21, characterized in that said component (100', 100") is mounted in at least two different predefined positions.

35. Sump (10') according to claim 34, characterized in that said component (100', 100") comprises an optical element (112', 112A", 112B"), said optical element comprising prism.

36. Sump (10') according to claim 21, characterized in that said component (100', 100") comprises an optical element (112', 112A", 112B"), said optical element comprising prism.

37. Sump (10') according to claim 21, characterized in that said component (100', 100") comprises a printed circuit (CS', CS") provided with electric contacts for connection of said component (100', 100") to one of an electric wiring or an electric connector.

38. Sump (10') according to claim 21, characterized by comprising an electronic module, said module comprising at least one of a light transmitter (T, T', T") and a light receiver (R, R', R") and an electronic processor.

39. Sump (10') according to claim 35, characterized by comprising coupling elements adapted to allow for a precision positioning of said component (100', 100"), so that it can be adjusted as to the liquid level definition.

40. Household appliance comprising a component according to claim 1.

41. Household appliance comprising a sump according to claim 21.

42. Sump (10, 10') for a household appliance, comprising:
   a container (C, C') adapted to contain at least a portion of a wash liquid;
   a sensor (11, 100', 100") adapted to detect at least one liquid level in said container (C, C') and comprising at least one light transmitter (T, T', T", T''') adapted to generate a light beam and one light receiver (R, R', R", R''') adapted to receive said light beam, and
   an optical element (12, 112', 112A", 112B") made of a material being at least partially transparent, adapted to affect said light beam depending on the content of said container (C, C'), said optical element comprising a prism and said container (C, C') being partially made of a transparent material which forms at least a portion of said optical element (12, 112', 112A", 112B").

43. Sump (10, 10') according to claim 42, characterized in that said optical element (12, 112', 112A", 112B") is built in or mounted in or on said container (C, C').

44. Sump (10, 10') according to claim 42, characterized by being adapted to detect at least one liquid level in said container (C').

45. Sump (10, 10') according to claim 21, characterized in that said optical element (12) is a prism.

46. Sump (10, 10') according to claim 21, characterized in that said optical element (12, 112', 112A", 112B") has an elongated shape and extends in one of a substantially vertical or substantially horizontal direction relative to an installation plane of said container (C, C').

47. Sump (10, 10') according to claim 42, characterized in that said optical element (12) has an elongated shape and extends substantially for a part of a surface (13) of said container (C).

48. Sump (10, 10') according to claim 21, characterized by comprising a seat (S) adapted to accommodate at least a portion of said sensor (11).

49. Sump (10, 10') according to claim 48, characterized in that said seat (S) comprises a plurality of fixing seats (20A, 20B).

50. Sump (10, 10') according to claim 48, characterized in that said seat (S) comprises fixing seats (20A, 20B) provided so as to obtain a sensor assembly (11) which can be mounted in an adjustable position.

51. Sump (10, 10') according to claim 42, characterized in that a surface (13') of said sump (10') comprises an aperture adapted to position a body (110', 110") of said sensor (100', 100") at least partially inside said container (C').

52. Sump (10, 10') according to claim 42, wherein said light transmitter (T', T", T''') and said light receiver (R', R", R''') make up one or more optical detection pairs (111'; 111A", 111B"), each pair for detecting at least one liquid level.

53. Sump (10, 10') according to claim 42, characterized in that said sensor (11) comprises a printed circuit (CS) provided with electric contacts for the electric connection of said sensor (11) to one of an electric wiring or an electric connector.

54. Sump (10, 10') according to claim 42, characterized by comprising an electronic module, said module comprising at least one of said light transmitter (T, T', T") and said light receiver (R, R', R"), and an electronic processor.

55. Household appliance comprising a sump according to claim 42.

* * * * *